US012793023B2

(12) United States Patent
Beheshti et al.

(10) Patent No.: US 12,793,023 B2
(45) Date of Patent: Nov. 10, 2026

(54) VEHICLE PRIORITIZATION

(71) Applicant: Zoox, Inc., Foster City, CA (US)

(72) Inventors: Seyed Parsa Beheshti, Belmont, CA (US); Meredith James Goldman, Redwood City, CA (US); Paul Orecchio, Denver, CO (US); Amir Takhmar, Mountain View, CA (US)

(73) Assignee: Zoox, Inc., Foster City, CA (US)

( * ) Notice: Subject to any disclaimer, the term of this patent is extended or adjusted under 35 U.S.C. 154(b) by 34 days.

(21) Appl. No.: 18/544,894

(22) Filed: Dec. 19, 2023

(65) Prior Publication Data

US 2025/0200529 A1 Jun. 19, 2025

(51) Int. Cl.
*G06Q 30/00* (2023.01)
*G06Q 10/20* (2023.01)
*G07C 5/00* (2006.01)

(52) U.S. Cl.
CPC ............. *G06Q 10/20* (2013.01); *G07C 5/006* (2013.01)

(58) Field of Classification Search
CPC ................................ G06Q 10/20; G07C 5/006
See application file for complete search history.

(56) References Cited

U.S. PATENT DOCUMENTS 9,720,410 B2 * 8/2017 Fairfield ......... B60W 60/00253
10,423,934 B1 * 9/2019 Zanghi ................. G01C 21/343
10,430,239 B2 * 10/2019 Tang ...................... G06F 9/4887
10,877,479 B2 * 12/2020 Landy .................. G05D 1/0088
10,901,415 B1 * 1/2021 Herbach .............. G05D 1/0088
11,560,154 B1 * 1/2023 Gate .................. G01C 21/3614
12,038,348 B1 * 7/2024 Okamoto ............... G06N 20/00
12,269,509 B1 * 4/2025 Dickerson ......... B60W 60/0015
2010/0262336 A1 10/2010 Rivas et al.

(Continued)

FOREIGN PATENT DOCUMENTS

EP 4167163 A1 * 4/2023 ............. G06Q 10/20
JP 2020102159 A * 7/2020 ........ B60W 50/0098

(Continued)

OTHER PUBLICATIONS

Dai, Qikun, et al. "Model predictive decision-making considering lane-changing time under emergency collision avoidance for intelligent vehicles." IEEE Transactions on Industrial Electronics 71.9 (2023): 11250-11261. (Year: 2023).*

(Continued)

*Primary Examiner* — Luis A Brown
(74) *Attorney, Agent, or Firm* — EIP US LLP

(57) ABSTRACT

A method is provided. The method comprises, for respective vehicles of a plurality of vehicles: (i) determining an urgency metric associated with the vehicle, the urgency metric being indicative of urgency in which to perform a task associated with the vehicle, and (ii) determining a length of time associated with performing the task for the vehicle, the task being performed by an operator of one or more operators, the one or more operators being located remote from the plurality of vehicles and being responsible for monitoring and/or controlling the plurality of vehicles. The method further comprises determining a preferred order in which the one or more operators are to perform the tasks based on the lengths of time and the urgency metrics associated with the plurality of vehicles.

18 Claims, 8 Drawing Sheets

(56) References Cited

U.S. PATENT DOCUMENTS

| | | | | |
|---|---|---|---|---|
| 2015/0134694 | A1 | 5/2015 | Burke et al. | |
| 2016/0148513 | A1 | 5/2016 | Beaurepaire | |
| 2017/0192423 | A1* | 7/2017 | Rust | G01C 21/28 |
| 2017/0308082 | A1* | 10/2017 | Ullrich | B60W 30/18 |
| 2018/0063013 | A1 | 3/2018 | Walkin | |
| 2018/0096427 | A1 | 4/2018 | Pierce et al. | |
| 2018/0259974 | A1 | 9/2018 | Lei et al. | |
| 2018/0293449 | A1 | 10/2018 | Sathyanarayana et al. | |
| 2019/0196464 | A1* | 6/2019 | Lockwood | G05D 1/0022 |
| 2020/0057443 | A1* | 2/2020 | Silver | B60W 30/18009 |
| 2020/0136948 | A1 | 4/2020 | Akhouri et al. | |
| 2020/0201315 | A1 | 6/2020 | Gogna et al. | |
| 2021/0276577 | A1* | 9/2021 | Adams | B60W 50/0205 |
| 2022/0028185 | A1* | 1/2022 | Wang | B60W 40/09 |
| 2022/0135026 | A1* | 5/2022 | Schleede | B60W 30/09 701/26 |
| 2022/0137615 | A1* | 5/2022 | Eperjesi | G05D 1/0027 701/2 |
| 2022/0295334 | A1 | 9/2022 | Sun et al. | |
| 2022/0355827 | A1* | 11/2022 | Hirano | G05D 1/0027 |
| 2023/0102518 | A1* | 3/2023 | Paul | G06Q 10/063 701/1 |
| 2024/0420523 | A1* | 12/2024 | Trivedi | G06F 16/00 |

FOREIGN PATENT DOCUMENTS

| | | | |
|---|---|---|---|
| KR | 10-2013-0007754 | A | 1/2013 |
| WO | 2009122925 | A1 | 10/2009 |

OTHER PUBLICATIONS

Lyu, Nengchao, et al. "Vehicle trajectory prediction and cut-in collision warning model in a connected vehicle environment." IEEE Transactions on Intelligent Transportation Systems 23.2 (2020): 966-981. (Year: 2020).*

Funke, Joseph, et al. "Collision avoidance and stabilization for autonomous vehicles in emergency scenarios." IEEE Transactions on Control Systems Technology 25.4 (2016): 1204-1216. (Year: 2016).*

Lee, Kibeom, and Dongsuk Kum. "Collision avoidance/mitigation system: Motion planning of autonomous vehicle via predictive occupancy map." IEEE Access 7 (2019): 52846-52857. (Year: 2019).*

Strickland, Mark, Georgios Fainekos, and Heni Ben Amor. "Deep predictive models for collision risk assessment in autonomous driving." 2018 IEEE International Conference on Robotics and Automation (ICRA). IEEE, 2018. (Year: 2018).*

Althoff, Matthias, Olaf Stursberg, and Martin Buss. "Model-based probabilistic collision detection in autonomous driving." IEEE Transactions on Intelligent Transportation Systems 10.2 (2009): 299-310. (Year: 2009).*

Aufrère, Romuald, et al. "Perception for collision avoidance and autonomous driving." Mechatronics 13.10 (2003): 1149-1161. (Year : 2003).*

International Search Report and Written Opinion dated Mar. 18, 2025 for International Application No. PCT/US2024/059314.

Non-Final Office Action dated Oct. 1, 2025 for U.S. Appl. No. 18/392,263.

Non-Final Office Action dated Jan. 17, 2025 for U.S. Appl. No. 18/395,157.

Final Office Action dated Jul. 25, 2025 for U.S. Appl. No. 18/395,157.

United States non-final Office Action dated Nov. 26, 2025 for U.S. Appl. No. 18/392,408.

United States Final Office Action dated Apr. 22, 2026 for U.S. Appl. No. 18/392,263.

United States non-final Office Action dated Feb. 6, 2026 for U.S. Appl. No. 18/395,157.

United States non-final Office Action dated Aug. 18, 2026 for U.S. Appl. No. 18/392,263.

* cited by examiner 210 204 206 208 202

| | Vehicle # | Estimated Time to Perform Task Associated with Vehicle | Location | Passengers | Vehicle Collision Metric | Urgency Metric |
|---|---|---|---|---|---|---|
| 112a | 1 | 180s | 0.3 | 0.2 | 0.25 | 0.25 |
| 112b | 2 | 120s | 0.3 | 0.3 | 0.4 | 0.33 |
| 112c | 3 | 60s | 0.1 | 0.1 | 0.1 | 0.1 |

FIG. 2

| Total Time to Perform Tasks | Total Time to Perform Tasks (including time to switch between tasks) |
|---|---|
| 360s | 380s |

FIG. 3

402 404

| Order # | Order of tasks/vehicles | Cost of Order |
|---|---|---|
| 1 | 1, 2, 3 | Total_Cost_Arrangement_1 |
| 2 | 1, 3, 2 | Total_Cost_Arrangement_2 |
| 3 | 2, 3, 1 | Total_Cost_Arrangement_3 |
| 4 | 2, 1, 3 | Total_Cost_Arrangement_4 |
| 5 | 3, 1, 2 | Total_Cost_Arrangement_5 |
| 6 | 3, 2, 1 | Total_Cost_Arrangement_6 |

FIG. 4

502 504

| Updated Preferred Order # | Order of tasks/vehicles | Cost of Order |
|---|---|---|
| 1 | 4, 2, 3, 1 | Total_Cost_Arrangement_1 |
| 2 | 2, 4, 3, 1 | Total_Cost_Arrangement_2 |
| 3 | 2, 3, 4, 1 | Total_Cost_Arrangement_3 |
| 4 | 2, 3, 1, 4 | Total_Cost_Arrangement_4 |

FIG. 5

| Operator 1 | | | Operator 2 | | | Operator 3 | | | Operator 4 | | |
|---|---|---|---|---|---|---|---|---|---|---|---|
| Vehicle Queue | Estimated Start Time | Estimated Finish Time | Vehicle Queue | Estimated Start Time | Estimated Finish Time | Vehicle Queue | Estimated Start Time | Estimated Finish Time | Vehicle Queue | Estimated Start Time | Estimated Finish Time |
| AV3 | 0 | 50 | AV5 | 0 | 100 | AV2 | 0 | 40 | AV7 | 0 | 180 |
| AV4 | 80 | 140 | AV1 | 130 | 160 | AV8 | 70 | 310 | | | |
| AV6 | 170 | 290 | | | | | | | | | |

FIG. 6A

| Operator 1 | | | Operator 2 | | | Operator 3 | | | Operator 4 | | | Operator 5 | | |
|---|---|---|---|---|---|---|---|---|---|---|---|---|---|---|
| Vehicle Queue | Estimated Start Time | Estimated Finish Time | Vehicle Queue | Estimated Start Time | Estimated Finish Time | Vehicle Queue | Estimated Start Time | Estimated Finish Time | Vehicle Queue | Estimated Start Time | Estimated Finish Time | Vehicle Queue | Estimated Start Time | Estimated Finish Time |
| AV3 | 0 | 50 | AV5 | 0 | 100 | AV2 | 0 | 40 | AV7 | 0 | 180 | AV8 | 0 | 240 |
| AV4 | 80 | 140 | AV6 | 130 | 250 | AV4 | 70 | 130 | | | | | | |
| | | | | | | | | | | | | | | |

FIG. 6B

| Object # | Classification/ Object Type | Current Location | Velocity | Predicted Future Location | Object Collision Metric |
|---|---|---|---|---|---|
| 1 | Pedestrian | [x, y, z] | $v = v_x + v_y + v_z$ | t1 = [x1, y1, z1] | $\phi_1$ |
| 2 | Vehicle | [x, y, z] | $v = v_x + v_y + v_z$ | t1 = [x1, y1, z1] | $\phi_2$ |
| 3 | Vehicle | [x, y, z] | $v = v_x + v_y + v_z$ | t1 = [x1, y1, z1] | $\phi_3$ |
| 4 | Vehicle | [x, y, z] | $v = v_x + v_y + v_z$ | t1 = [x, y, z] | $\phi_4$ |
| 5 | Vehicle | [x, y, z] | $v = v_x + v_y + v_z$ | t1 = [x, y, z] | $\phi_5$ |
| 6 | Pedestrian | [x, y, z] | $v = v_x + v_y + v_z$ | t1 = [x, y, z] | $\phi_6$ |
| 7 | Pedestrian | [x, y, z] | $v = v_x + v_y + v_z$ | t1 = [x1, y1, z1] | $\phi_7$ |
| 8 | Vehicle | [x, y, z] | $v = v_x + v_y + v_z$ | t1 = [x1, y1, z1] | $\phi_8$ |
| 9 | Pedestrian | [x, y, z] | $v = v_x + v_y + v_z$ | t1 = [x1, y1, z1] | $\phi_9$ |

FIG. 7

VEHICLE PRIORITIZATION

BACKGROUND

Autonomous and partially autonomous vehicles are increasingly being tested and used not only for convenience, but also to improve road safety. An autonomous vehicle may require assistance from a human operator when there is a problem or fault with the vehicle.

BRIEF DESCRIPTION OF DRAWINGS

The detailed description is described with reference to the accompanying figures. The use of the same reference numbers in different figures indicates similar or identical components or features.

FIG. 2 depicts an example table of urgency metrics and lengths of time associated with different vehicles and tasks;

FIG. 3 depicts an example table showing the time to perform a plurality of tasks and the total time to perform the plurality of tasks when considering the time taken to switch between tasks;

FIG. 4 depicts an example table of order costs for a plurality of different orders for performing the tasks;

FIG. 5 depicts an example table of order costs for a plurality of updated preferred orders;

FIG. 6A depicts an example table allocating tasks to a number of operators;

FIG. 6B depicts an example table allocating tasks to an increased number of operators;

FIG. 7 depicts an example table of perception data generated by a vehicle;

DETAILED DESCRIPTION

Figure 1:
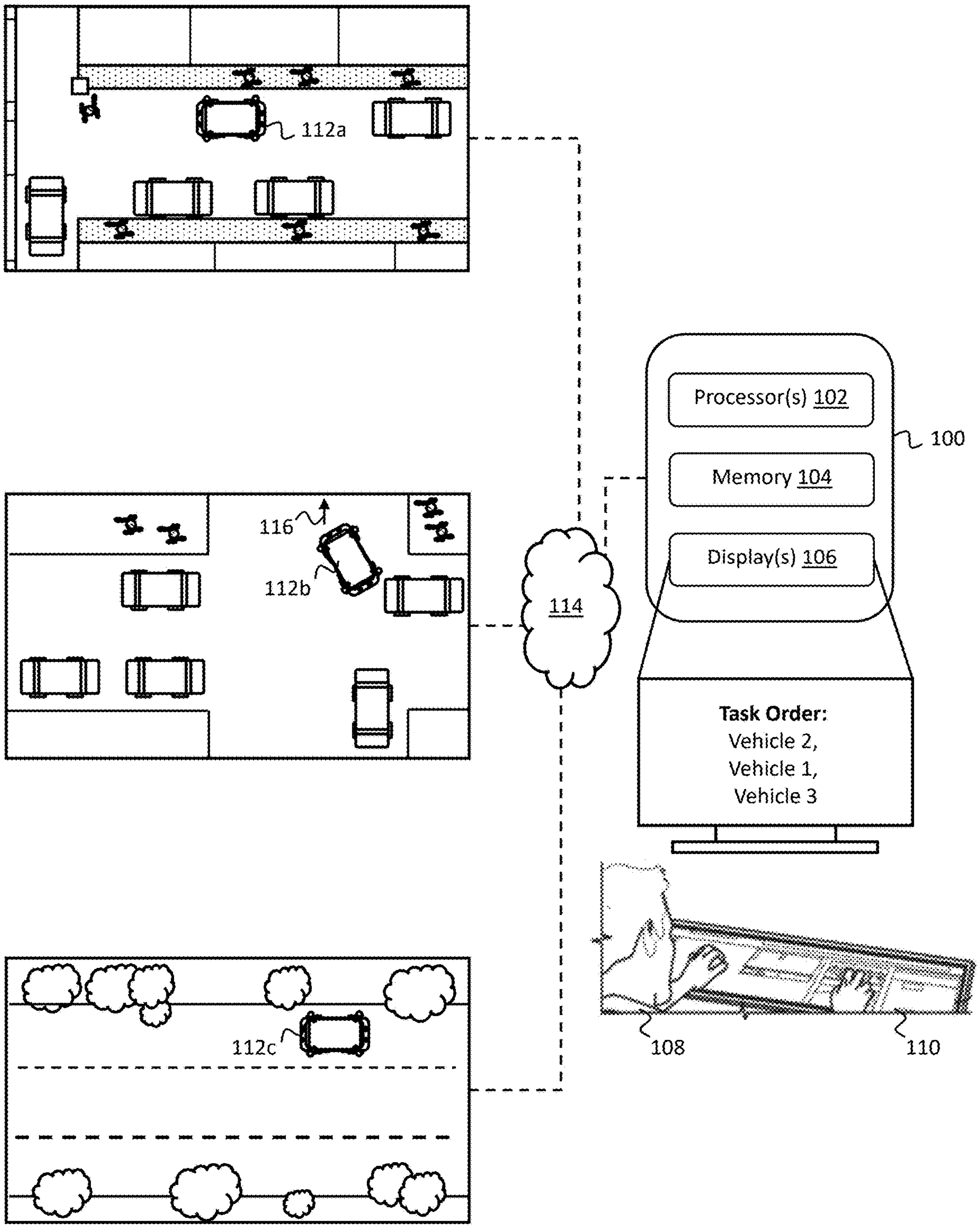
FIG. 1 is a pictorial diagram of system, including a plurality of vehicles and remote system for monitoring the vehicles, according to an example.

This application relates to systems, methods and computer-readable media for prioritizing the order in which one or more human operators (also known as teleoperators), should attend to the needs of a plurality of autonomous vehicles, when assistance is required. For example, two or more vehicles may require the assistance of an operator at the same time (such as within the same time frame). The operator(s) may be located remote from the vehicle, and can monitor and/or control the vehicles from a remote system. A vehicle may request assistance from an operator in certain scenarios, such as when the vehicle experiences a fault, an inter-vehicle incident, contact with an object, or some other problem, or is unsure how to proceed next. An operator may therefore be required to perform a task for each of the vehicles, such as: remotely control the vehicle, provide guidance to the vehicle, reset the vehicle, provide an input to the vehicle if a computing device on the vehicle requires confirmation from an operator, arrange for maintenance personnel to physically attend to the vehicle, allow passengers on board the vehicle to exit from the vehicle (when safe to do so), etc.

The present disclosure relates to determining an order in which one or a limited number of operators attend to the needs of a fleet of vehicles requiring assistance. Particular vehicles may therefore be prioritized over other vehicles. The order in which the operator (or one or more operators) attends to the tasks (and therefore the vehicles), may depend on one or more factors, such as an urgency of the task (which itself may depend on one or more factors) and the length of time associated with performing the task (that is, the amount of time needed for the operator to attend to the needs of the vehicle). The present disclosure relates to determining a preferred order in which an operator is to perform the tasks based on an urgency metric associated with each vehicle/task and the length of time associated with performing the task. The urgency metric may be a value, such as an unbounded value or a value within a range of values, such as a value between 0 and 0.5, or 0 and 1, or 0 and 100, for example. A higher urgency metric for a vehicle may mean that the task to be performed for that vehicle is more urgent. The length of time may be longer for more complex tasks, such as those requiring multiple operations/processes, and may be shorter for simple tasks. A shorter task may involve the operator providing an input, such as associating an object detected by the vehicle with an object classification. A longer task may involve navigating the vehicle from one location to another location, such as from a busy intersection to a quiet side street.

There may be a plurality of different orders in which an operator may attend to the tasks. For example, if there are 3 vehicles requiring assistance, then there are 6 different orders/arrangement of the vehicles and tasks. In general terms, for N vehicles, there are N! orders (N factorial orders) in which the tasks can be arranged. An order of tasks or vehicles may be known alternatively as an arrangement.

In examples, a "cost" may be determined for each order (referred to herein as an "order cost"), where the order cost is based on the urgency metrics associated with the vehicles/tasks and the lengths of time associated with performing the tasks. The order cost may be a value, such as a value within a range of values. A higher order cost for an order may mean that the order is less desirable when compared to a lower order cost. A preferred order (which may be the order that is ultimately chosen) may be the order that has the lowest cost. As an example, high urgency and short tasks may be prioritized over high urgency long tasks, and low urgency short tasks may be prioritized over low urgency long tasks.

The present disclosure therefore relates to determining a preferred order that balances the requirements of the vehicles and in some cases the passengers in the vehicle (which may be represented by the "urgency metrics"), with the overhead for the operator (which may be represented by the lengths of time associated with performing the tasks for the vehicles).

In examples, the urgency metric for each vehicle/task may be determined based on one or more factors, such as how likely the vehicle is to collide with or contact objects that are around the vehicle. The urgency metric associated with a vehicle may therefore be based on a contact metric associated with the vehicle, where the contact metric is indicative of or based on a probability of the vehicle colliding with or contacting one or more objects in an environment around the vehicle. The contact metric may be a value, such as an unbounded value or a value within a range of values, such as a value between 0 and 0.5, or 0 and 1, or 0 and 100, for example. A higher contact metric may mean that the vehicle is more likely to collide with or contact one or more objects. For example, a first vehicle located within a busy city that is surrounded by vehicles and pedestrians may be associated with a higher contact metric than a second vehicle located on a countryside road, with fewer or no other vehicles or pedestrians nearby. In such cases, the urgency metric associated with the first vehicle may be higher than the urgency metric associated with the second vehicle (although in examples, the urgency metric may be based on other factors in addition to the contact metric). In examples, the contact metric may be referred to as a collision metric.

Accordingly, in examples described herein, there is provided a system, comprising: one or more processors, and one or more non-transitory computer readable media having instructions stored thereon which, when executed by the one or more processors, cause the one or more processors to perform operations comprising: (a) for respective vehicles of a plurality of vehicles: determining or receiving an urgency metric associated with the vehicle, the urgency metric being indicative of an urgency in which to perform a task associated with the vehicle, and (b) determining or receiving a length of time associated with performing the task for the vehicle, the task being performed by an operator of one or more operators, the one or more operators being located remote from the plurality of vehicles and being responsible for monitoring and/or controlling the plurality of vehicles, and (c) determining a preferred order in which the one or more operators are to perform the tasks based on the lengths of time and the urgency metrics associated with the plurality of vehicles.

The plurality of vehicles that require assistance from an operator may be said to be "stuck". In examples, the plurality of vehicles may be stationary. In other cases, however, it will be appreciated one or more vehicles may not necessarily be stationary (for example, a vehicle may be travelling at a low speed, and may be pulling over before waiting for assistance, or the vehicle may be travelling at a normal speed).

An urgency metric and length of time may be determined or received for each vehicle of the plurality of vehicles. That is, each vehicle/task may be associated with: (i) an urgency metric, and (ii) a length of time. Accordingly, the above steps (a) and (b) may be repeated for each vehicle of the plurality of vehicles. For example, a first urgency metric may be determined or received for a first vehicle, and a first length of time may be determined or received for the first vehicle, and a second urgency metric may be determined or received for a second vehicle, and a second length of time may be determined or received for the second vehicle. The preferred order in which an operator is to perform the tasks (step (c)) is then determined based on the first and second lengths of time and the first and second urgency metrics. It will be appreciated that there may be further vehicles in other examples, and therefore the above steps can be repeated for the further vehicles, such as third, fourth, fifth vehicles. More generally, throughout this disclosure, any reference to any process or method step being performed for respective vehicles, tasks, orders (or for each vehicle, task, order), means that the process or method step may be repeated for each vehicle of the plurality of vehicles, in the same way as discussed above.

A task for a vehicle may be said to be associated with the vehicle. A task may involve the operator performing one or more operations/processes for the vehicle (collectively the one or more operations/processes may be referred to as a task even though multiple steps may be performed by the operator). For example, there may be one or more faults or issues with the vehicle. A length of time associated with performing a task may therefore be based on the length of time to perform one or more operations/processes for the vehicle.

In examples, a length of time may be determined based on the type of fault or faults with the vehicle. For example, a fault may be associated with a particular subsystem of the vehicle. For example, multiple faults may be associated with a single component and/or the mitigating action may be shared between faults. In instances such as these, the length of time may be less to address both faults than if one were to simply individually add two lengths of time together each corresponding to one of the faults. Thus, depending on a subsystem of the vehicle that the fault is associated with, a mitigating action that the fault is associated with, historical information regarding times to address multiple faults, etc. the length of time to service multiple faults may be determined with more accurate granularity. This information may be stored in a table format with a correction factor for each fault or combination of faults and/or determined via calculation.

It will be appreciated that throughout this disclosure, any reference to an urgency metric being associated with a vehicle may also or alternatively mean that the urgency metric is associated with the task for that vehicle.

In examples, the urgency metric may be based on a contact metric associated with the vehicle, where the contact metric is based on a probability of the vehicle colliding with or contacting one or more objects in an environment around the vehicle. Unless stated otherwise, "based on" may mean that the term (in this case, the urgency metric) is "at least partially based on" one or more factors (in this case the contact metric). The contact metric may alternatively be known as a "vehicle contact metric".

The system may be used by an operator (or one or more operators) to monitor and/or control the plurality of vehicles. The system may be communicatively coupled to the plurality of vehicles, such as via one or more wired and/or wireless networks.

In examples, the system may itself determine urgency metrics for the vehicles. For example, the system may receive data from each vehicle that enables the system to determine an urgency metric for that vehicle. In examples where the urgency metric is based on the contact metric, the vehicles may themselves determine the contact metrics and transmit the contact metrics to the system (so that the system can determine the urgency metric for the vehicles based on the respective contact metrics) or the system may determine the contact metrics for the vehicles based on data received from the vehicles. For example, the vehicles may each transmit perception data (discussed below) to the system which may be used by the system to determine the contact metrics for the vehicles. In another example, the vehicles may themselves determine an urgency metric and transmit the urgency metric to the system. In examples where the urgency metric is based on the contact metric, the vehicles may therefore determine the contact metrics and the urgency metrics. In examples, a contact metric may be determined for each vehicle of the plurality of vehicles.

Similarly, in examples, the system may itself determine lengths of times associated with performing the tasks for the vehicles. For example, the system may receive data from each vehicle that enables the system to determine the length of time for that vehicle. The data may be indicative of the task associated with the vehicle, such as the type of fault or problem with the vehicle. In other examples, the vehicles may themselves determine the lengths of time and transmit the lengths of time to the system. A length of time may be a predicted time for performing the task.

In examples, the urgency metric may be determined based on data available to the vehicle or system at a particular point in time. In some cases, as time passes, an urgency metric for a vehicle may be updated. A new, higher urgency metric may therefore supersede an earlier determined urgency metric, for example.

In examples, the urgency metric may be solely based on the contact metric. In such cases, the urgency metric may therefore be the contact metric.

As briefly mentioned above, perception data may be determined by each vehicle, where the perception data may be associated with one or more objects in the environment around the vehicle. In examples, the perception data may be used by the vehicle, such as a planning component of the vehicle, to navigate in the environment. The perception data may be indicative of how the vehicle perceives the environment, and may be based on sensor data obtained by one or more sensors on the vehicle. In examples, the perception data may be generated by a perception component of the vehicle. The perception component may determine one or more characteristics for each of the detected objects. For example, a characteristic may include any or all of the following: a classification (or object type), a location, a size, a speed, etc. The perception component may therefore classify the objects. Example classifications may include, vehicle, pedestrian, building, road surface, cyclist, tree, traffic light, etc. The perception data may comprise one or more characteristics associated with each object. The location may be a current location and/or a predicted or future location of the object. The perception data may therefore additionally comprise prediction data, where the prediction data is generated by a prediction component of the vehicle. The prediction component may generate probability data, such as one or more probability maps or one or more future trajectories representing prediction probabilities of possible future locations of one or more objects in the environment. In examples, a contact metric for an object (referred to herein as an "object contact metric"), may be determined using the perception data. For example, the object contact metrics may be based on the prediction data. A contact metric for a vehicle (i.e., the "vehicle contact metric"), may be based on one or more object contact metrics. For example, the vehicle contact metric may be a sum or average or weighted average of the object contact metrics for one or more objects in the environment around the vehicle. In another example, the vehicle contact metric may be the maximum object contact metric of a plurality of object contact metrics.

In an example, a single operator may perform the tasks for the plurality of vehicles. In other cases, a plurality of operators may perform the tasks. In examples, some operators may be assigned to attend to certain types of vehicle(s), such as general vehicles, and other operators may be assigned to attend to different types of vehicle(s), such as emergency vehicles. In some cases, depending on the nature of the task, multiple operators may be assigned to a single vehicle/task. For example, one operator may attend to one or more processes/operations for the vehicle, while another operator may attend to one or more other processes/operations for the vehicle. In some examples, each operator may have a corresponding queue of vehicles to attend to. The disclosed techniques can be used to assign vehicles to these queues and/or order the vehicles in the queues.

In examples, the one or more processors may further cause the tasks to be performed based on one or more inputs from the one or more operators. For example, the tasks may be performed sequentially by a single operator, or at least some of the tasks may be performed simultaneously by two or more operators. Causing the tasks to be performed may comprise sending data to the plurality of vehicles to cause the vehicle to perform an action.

The system may comprise one or more workstations or terminals, each operated by an operator. The workstations/terminals may be co-located, or may be remote from each other (and remote from the plurality of vehicles). As such, the system may be referred to as a remote system.

It will be appreciated that there may be additional vehicles (that is, additional to the plurality of vehicles) that do not require assistance from the operator(s) at the time the preferred order is determined. Urgency metrics and/or lengths of time may therefore be determined or received just for the plurality of vehicles that require assistance. In some examples, there may be a cap or limit on the number of vehicles that may be addressed per operator. For example, if 10 vehicles require assistance, and the number of vehicles that can be addressed by an operator is limited to 5, the plurality of vehicles may include only 5 vehicles. In other examples, the cap or limit may be based on the lengths of time. For example, the cap or limit on the number of vehicles may be based on the total length of time taken to perform all of the tasks. The cap/limit may be greater if the tasks are short. In examples, an operator may monitor/control vehicles in a particular region. In some cases, if the number of vehicles requiring assistance increases, one or more additional operators may be required to assist with some of the vehicles.

In examples, determining a preferred order in which the one or more operators are to perform the tasks, may comprise: (A) determining a plurality of different orders in which the one or more operators can perform the tasks associated with the plurality of vehicles, and (B) for respective orders of the plurality of different orders, determining an order cost associated with the order, the order cost being based on: (i) the urgency metrics associated with the plurality of vehicles, (ii) the lengths of time associated with performing the tasks, and (iii) the order in which the tasks are to be performed, and (C) selecting, based on the order costs, the preferred order from the plurality of different orders. The order in which the tasks are performed may relate to the position of the tasks within the order (such as whether a task is performed first, second, last, etc.).

An order cost may therefore be determined for each order of the plurality of different orders.

In examples, selecting, based on the order costs, the preferred order from the plurality of different orders may comprise selecting from the plurality of different orders, the preferred order, the preferred order being associated with the lowest order cost.

In examples, after the preferred order has been determined, an additional vehicle may require assistance (that is, additional to the original plurality of vehicles associated with the preferred order of tasks). There may therefore be an additional task (associated with the additional vehicle) for the operator(s) to perform. In such cases, rather than repeating the above process for the updated plurality of vehicles (the updated plurality of vehicles including the original plurality of vehicles plus the additional vehicle), it may be more computationally efficient to add the additional task/vehicle into the preferred order at a particular position. For example, if there are 3 vehicles in the preferred order (that is, the original plurality of vehicles comprises 3 vehicles), and a fourth vehicle now requires assistance, there are 4 different places/positions in which the fourth vehicle can be added to the preferred order (first, second, third or fourth). In examples, an order cost may be determined for each of these 4 updated preferred orders (referred to herein as a plurality of updated preferred orders), and the order cost having the lowest order cost may then selected.

The selected order may be referred to as an updated preferred order, and is therefore selected from the plurality of updated preferred orders. Each of the plurality of updated preferred orders have the tasks in the same order as in the preferred order, but also include the additional task at a particular position within the preferred order. For example, if the preferred order had 3 tasks in the following order: task #2 (associated with vehicle 2), task #1 (associated with vehicle 1) and task #3 (associated with vehicle 3), then an example updated preferred order may have the 4 tasks in the following order: task #2 (associated with vehicle 2), task #4 (associated with vehicle 4), task #1 (associated with vehicle 1) and task #3 (associated with vehicle 3). The original tasks can remain in the same order (relative to each other), while the additional task is included at a particular position in the preferred order. It is this particular position that is to be determined. In some cases, the position of a task within the order may change. For example, tasks 1 and 4 may now be positioned third and fourth within the order, rather than second and third.

Accordingly, in examples, after selecting the preferred order, the operations may further comprise: (i) determining that an additional task associated with an additional vehicle is required to be performed by the one or more operators, and (ii) determining where in the preferred order the additional task is to be performed.

In examples, determining where in the preferred order the additional task is to be performed may comprise determining where in the preferred order the additional task is to be performed based on an urgency metric associated with the additional vehicle and/or a length of time associated with performing the additional task.

Following on from the earlier example, it may be that the updated preferred order may not be the order with the lowest overall order cost, however, it may be more computationally efficient to determine order costs associated with the 4 updated preferred orders, rather than order costs associated with 24 (4 factorial) different orders in which the 4 vehicles/tasks could have been ordered had the original plurality of vehicles included the additional vehicle.

Accordingly, in examples, determining where in the preferred order the additional task is to be performed may comprise determining an updated preferred order, the updated preferred order having the additional task at a particular position within the preferred order. Determining the updated preferred order may comprise: (A) determining a plurality of updated preferred orders, the plurality of updated preferred orders having the tasks associated with the plurality of vehicles arranged in the same order as in the preferred order and the additional task associated with the additional vehicle arranged at different positions within the preferred order, (B) for respective orders of the plurality of updated preferred orders, determining an order cost associated with the order, the order cost being based on: (i) the urgency metrics associated with the plurality of vehicles and an urgency metric associated with the additional vehicle, (ii) the lengths of time associated with performing the tasks and a length of time associated with performing the additional task, and (iii) the order in which the tasks in the updated preferred order are to be performed, and (C) selecting, based on the order costs, the updated preferred order from the plurality of updated preferred orders. Accordingly, an order cost may be determined for each order of the plurality of updated preferred orders.

In examples, the selected updated preferred order may be the updated preferred order having the lowest order cost.

In examples, the number of updated preferred orders (within the plurality of updated preferred orders) is equal to the number of original tasks (equal to the number of plurality of vehicles) plus one (for the new additional task and vehicle). Returning to the example above, there are 4 (3+1) possible updated preferred orders.

In examples, determining that an additional task associated with an additional vehicle is required to be performed may comprise determining, within a threshold period of time, that an additional task associated with an additional vehicle is required to be performed. The threshold period of time may be, or be based on, a time after determining the preferred order. As an example, the threshold period may be 30 seconds. Thus, in some cases, if an additional vehicle requires assistance within the threshold period of time (such as the vehicle requests assistance within 30 seconds of the preferred order being determined by the system), the additional vehicle may be added to the plurality of tasks that are to be performed by the operator. If the vehicle requires assistance outside of the threshold period of time (such as the vehicle requests assistance within 45 seconds of the preferred order being determined by the system), the additional vehicle may be ignored (for example, not added to the plurality of tasks that are to be performed by the operator). The additional vehicle may instead be attended to by another operator, or the same operator but at a later point in time.

As mentioned above, an order cost may be based on the order in which the tasks are to be performed (that is, the position in which the tasks are performed). Practically, this may be taken into account by determining how long it takes (from each vehicle's perspective), for the task to be completed/resolved from the moment the operator begins the first task until the task for each particular vehicle is completed. The time taken for the task to be resolved (from a vehicle's perspective) may be known as the resolution time for that vehicle. It will take longer for the task to be resolved if the task is further down the order, since the resolution time is based on the cumulative length of time associated with performing prior tasks in the order. For the vehicle first in the order, the resolution time may be equal to the length of time associated with performing the task for the first vehicle since there are no prior tasks to be performed. For the vehicle second in the order, the resolution time will be based on the length of time associated with performing the task for the second vehicle and the length of time associated with performing the task for the first vehicle. More generally, for any vehicle/task, the resolution time for that vehicle/task will be based on the length of time associated with performing the task for the vehicle and the cumulative length of time associated with performing prior tasks in the order.

In examples, a resolution time associated with a particular task/vehicle may be a time period, such as a time period between a time the operator begins performing a task that is positioned first in the order and a time when the operator completes the task associated with the vehicle.

Accordingly, in examples, for respective orders of the plurality of different orders, determining an order cost associated with the order may comprise: determining for respective tasks in the order: (A) a resolution time based on: (i) the length of time associated with performing the task, and (ii) the cumulative length of time associated with performing prior tasks in the order, and (B) a task cost based on: (i) the resolution time, and (ii) the urgency metric associated with the vehicle. The order cost associated with the order may be based on a sum of the task costs for the order.

A resolution time and task cost may be determined for each task in the order. The order cost for each order of the plurality of orders is therefore based on the task costs. As an example, if there are 3 tasks that are to be performed (associated with 3 different vehicles), then 3 task costs may be determined. In examples, the order cost associated with an order may be a sum of the task costs for the order. For example, the order cost may be a sum of those 3 task costs. Because the task cost is based on the resolution time (which is itself based on the position of the task within the order), the task cost is based on the position of the task within the order.

In examples, the task cost associated with a task for a vehicle is based on or equal to the resolution time multiplied by the urgency metric associated with the task/vehicle.

In examples, the resolution time may be further based on at least one task switching time, the task switching time being indicative of a time taken for an operator to switch from one task to another task. For example, if the operator is required to perform 3 tasks, then it may take the operator time to switch between tasks. For example, if it takes the operator 10 seconds to switch between tasks, then the resolution time for the second vehicle/task may additionally include one task switching time (equal to 10 seconds in this example) and the resolution time for the third vehicle/task may additionally include two switching times (equal to 20 seconds in this example, since the operator is required to switch tasks twice). In examples, the task switching time may be based on the type of task(s) being switched between.

In the same way, an order cost may be determined for each of the updated preferred orders when an additional task is to be performed. Accordingly, in examples, for respective orders of the plurality of updated preferred orders, determining an order cost associated with the order may comprise determining for respective tasks in the order: (A) a resolution time based on: (i) the length of time associated with performing the task, and (ii) the cumulative length of time associated with performing prior tasks in the order, and (B) a task cost based on: (i) the resolution time, and (ii) the urgency metric associated with the vehicle. The order cost associated with the order may be based on a sum of the task costs for the order.

In addition to, or instead of the urgency metric being based on the contact metric, the urgency metric may be based on one or more other factors. Accordingly, in examples, the urgency metric associated with the vehicle may be based on one or more of: one or more characteristics of one or more passengers in the vehicle, traffic conditions, a location of the vehicle, a time of day, or a type of fault associated with the vehicle.

A characteristic of one or more passengers in the vehicle may include: a number of passengers in vehicle or a demographic of one or more passengers. For example, a demographic may be that a passenger is a child, an elderly person, a person with a disability, etc.

As an example, a higher number of passengers in the vehicle may result in a higher urgency metric when compared to a lower number of passengers. It may therefore be more useful to prioritize vehicles having more passengers onboard.

In examples, the urgency metric may be based on traffic conditions such as: the vehicle's expected impact to traffic patterns, danger to passengers from traffic, danger to agents external to the vehicle, traffic conditions for a particular time of day, etc. The traffic conditions may take into account the vehicles current location. Traffic conditions may be determined based on perception data, historic data, and/or data from third party sources.

In examples, the type of fault associated with the vehicle (which may correspond to the type of task that is to be performed), may require a rescue operation to be performed (that is, the operator may be required to control the vehicle to allow the passenger(s) to exit the vehicle at a safe location). In some examples, personnel may be required to physically attend to the vehicle to manually control or perform maintenance on the vehicle. Accordingly, the urgency metric may be based on the type of fault associated with the vehicle. In an example, the complexity and/or duration of the rescue operation may be taken into account (for example, a rescue operation with more lead time may need to be stared sooner, which may result in a higher urgency metric). In examples, the type of fault may present a danger to occupants or the public, etc. For example, a system fault flagged as possibly presenting a hazard in the form of releasing a gas or liquid. More dangerous faults may therefore result in a higher urgency metric.

In examples in which the urgency metric is based on a location of the vehicle, the urgency metric may be based on one or more of: a location of the vehicle relative to a junction, intersection or other road feature, such as a train tracks, a location of the vehicle relative to traffic, a location of the vehicle relative to a safe drop off location (such as when the complexity and/or duration of the task requires the passenger(s) to exit the vehicle), a speed limit of a road on which the vehicle is located, a lane in which the vehicle is located or a number of lanes for travelling in the same direction as the vehicle. For example, if the vehicle is currently located in the middle of an intersection, the urgency metric may be higher than if the vehicle was located on a country road. If the vehicle is located on a road having two or more lanes for travelling in the same direction as the vehicle, then the urgency metric may be lower than if the vehicle was located a road having only one lane for travelling in the same direction as the vehicle (because the vehicle is not obstructing passage along the road). A higher number of lanes may therefore result in a lower urgency metric. If the vehicle is located in an overtaking lane (such as a lane that is to the left of an inside lane), then the urgency metric may be higher than if the vehicle was located in the inside lane (because an overtaking lane may be considered as more dangerous). In examples, the further the vehicle is located to the left, the higher the urgency metric. If the vehicle is located on a road having a relatively high speed limit, then the urgency metric may be higher than if the vehicle was located a road having a lower speed limit (because the road may be seen as more dangerous). If the vehicle is located far from a safe drop off location, then the urgency metric may be higher than if the vehicle was located closer to the drop off location.

In examples, a plurality of operators may perform the tasks associated with the plurality of vehicles, rather than a single operator. In such cases, there may be N vehicles and N tasks, and M operators to perform the tasks associated with the plurality of vehicles, where N>M. The operations may comprise: assigning the first M tasks in the preferred order to the M operators (such that each operator is assigned one task) and assigning the remaining tasks in the preferred order to the M operators based on a total resolution time for each operator, the total resolution time being based on a cumulative length of time associated with performing tasks currently assigned to the operator. The remaining tasks may be assigned sequentially. In some examples, there may be a cap on the number of tasks/vehicles assigned to the operator and/or the total resolution time for an operator. When the cap is met, no further tasks/vehicles may be assigned to the operator. This can reduce the load or burden on the operator. In some examples, tasks can be apportioned to available operators based on the predicted total resolution time to avoid overburdening of operators. In some examples when an operator finishes a task earlier than predicted and/or has availability, an idle window may be available and a corresponding task may be assigned with a total resolution time being within the idle window.

In examples, each vehicle may alert the operator(s) that assistance is required (i.e., that a task is required to be performed). Accordingly, in examples, the operations may further comprise: receiving data from respective vehicles of the plurality of vehicles at the system, and based on the data, determining that the respective vehicles of the plurality of vehicles require a task to be performed by an operator. In an example, the data may be the urgency metric, and the remote system may infer from the receipt of the urgency metric that a task is to be performed. In other examples, the data may comprise a request for assistance, or the data may be an indication that there is a fault with the vehicle, etc.

In examples, there may be a plurality of processes/operations that need to be performed for a vehicle. In some cases, the nature of one process/operation for the vehicle may be that it is less important than another process/operation for the vehicle, so that it can be attended to by an operator at a later time. For example, if two vehicles require assistance, the operator may attend to a primary process or operation for the first vehicle, then attend to the second vehicle, before returning to attend to a secondary process or operation for the first vehicle. In such cases, urgency metrics and/or lengths of time, may be determined for each process/operation, rather than or in addition to an urgency metric for the vehicle itself. In the same way as discussed above, a preferred order in which these processes/operations are to be performed may be determined based on the urgency metrics and/or lengths of time. The present disclosure may therefore be extended to such scenarios. In examples, an urgency metric for a vehicle may be based on one or more urgency metrics for one or more processes/operations.

According to a second aspect of the present disclosure, there is provided a method, comprising: (A) for respective vehicles of a plurality of vehicles: (i) determining an urgency metric associated with the vehicle, the urgency metric being indicative of urgency in which to perform a task associated with the vehicle, and (ii) determining a length of time associated with performing the task for the vehicle, the task being performed by an operator of one or more operators, the one or more operators being located remote from the plurality of vehicles and being responsible for monitoring and/or controlling the plurality of vehicles, and (B) determining a preferred order in which the one or more operators are to perform the tasks based on the lengths of time and the urgency metrics associated with the plurality of vehicles.

In examples, the above method steps may be performed by a system remote from the plurality of vehicles. In other examples, some of the method steps may be performed by the system and some of the method steps may be performed by the vehicles. For example, as previously discussed, the system or the vehicles may determine either or both of: (i) the urgency metrics and/or (ii) the lengths of time. The system may then determine the step of determining the preferred order.

According to a third aspect of the present disclosure, there is provided one or more non-transitory computer-readable media storing instructions that, when executed by one or more processors of a system, cause the system to perform operations comprising, for respective vehicles of a plurality of vehicles: determining or receiving an urgency metric associated with the vehicle, the urgency metric being indicative of urgency in which to perform a task associated with the vehicle, and determining or receiving a length of time associated with performing the task for the vehicle, the task being performed by an operator of one or more operators, the one or more operators being located remote from the plurality of vehicles and being responsible for monitoring and/or controlling the plurality of vehicles, and determining a preferred order in which the one or more operators are to perform the tasks based on the lengths of time and the urgency metrics associated with the plurality of vehicles.

More detailed examples, as well as systems, method(s) and computer-readable media of the present disclosure will now be presented, with reference to the accompanying figures.

FIG. 1 depicts an example implementation of the present disclosure. In particular, FIG. 1 depicts an example system 100, that is located remotely from a plurality of autonomous vehicles. In this example, there are three vehicles (including a first vehicle 112*a*, a second vehicle 112*b* and a third vehicle 112*c*). In other examples, there may be a different number of vehicles.

Each vehicle 112*a*, 112*b*, 112*c* is located within an environment, and may navigate through the environment autonomously based on data obtained by sensors on the vehicle 112*a*, 112*b*, 112*c*. In this example, the first vehicle 112*a* is located within an area of a town or city, the second vehicle 112*b* is located within another area of a town or city (in this case at an intersection), and the third vehicle 112*c* is located within an area of the countryside. The vehicles 112*a*, 112*b*, 112*c* of this example are remote from each other, but in some cases, the vehicles 112*a*, 112*b*, 112*c* may be near to each other, such as within the same city, or within a particular area or region of a city.

As shown, the remote system 100 is communicatively coupled to the plurality of vehicles 112*a*, 112*b*, 112*c* via one or more networks 114. Data may be transmitted between the remote system 100 and any of the vehicles 112*a*, 112*b*, 112*c* via the network 114. In examples, data may be transmitted between vehicles 112. Accordingly, each such vehicle may comprise one or more network interfaces (shown in FIG. 9) to enable data to be transmitted to, and received from, the remote system 100. The remote system 100 may also comprise one or more network interfaces.

As shown, the system 100 comprises one or more processors 102 and one or more non-transitory computer readable media 104 having instructions stored thereon which, when executed by the one or more processors 102, cause the one or more processors 102 to perform particular operations, which will be discussed in more detail below. It will be appreciated than any reference to the remote system 100 performing an action/operation will be understood to be performed by the one or more processors 102 of the system 100.

A human operator 108 may monitor and/or control one or more vehicles 112*a*, 112*b*, 112*c* via the system 100. For example, the operator 108 may observe data that has been received from a vehicle 112*a*, 112*b*, 112*c* and output on one or more displays 106 of the system 100. For example, the operator 108 may view one or more video feeds from one or more cameras on the vehicles 112. In some examples, a 2D or 3D model of the environment around a vehicle 112*a*, 112*b*, 112*c* may be rendered on the display 106, where the model includes representations of one or more objects around the vehicle 112. Such a model may be generated based on perception data generated by each vehicle (discussed in more detail below). An operator 108 may therefore be able to monitor one or more vehicles 112*a*, 112*b*, 112*c* in this way. In some cases, the operator 108 may provide instructions, such as driving or navigation instructions to a vehicle 112*a*, 112*b*, 112*c* to remotely guide a vehicle 112, when required.

In examples, a single operator 108 may monitor the plurality of vehicles 112*a*, 112*b*, 112*c* and/or may be responsible for the plurality of vehicles 112*a*, 112*b*, 112*c* when assistance is required. In other examples, two or more operators may monitor the plurality of vehicles 112*a*, 112*b*, 112*c* and/or may be responsible for the plurality of vehicles 112*a*, 112*b*, 112*c* when assistance is required.

The system 100 may further comprise one or more input devices 110 to receive user input from the operator 108. For example, the user input may cause an instruction to be transmitted to the vehicle 112*a*, 112*b*, 112*c* via the network 114 which causes the vehicle 112*a*, 112*b*, 112*c* to perform an action, such as follow a particular navigation path through the environment, address a fault or error, cause a computing system/device of the vehicle 112*a*, 112*b*, 112*c* to reset or restart, etc. In an example, the one or more displays 106 are themselves input devices 110. For example, the one or more displays 106 may comprise a touch screen display 106 which can accept user input.

Each vehicle 112*a*, 112*b*, 112*c* may also comprise one or more processors (shown in FIG. 9) and one or more non-transitory computer readable media (shown in FIG. 9) having instructions stored thereon which, when executed by the one or more processors, cause the one or more processors to perform particular operations, which will be discussed in more detail below. It will be appreciated than any reference to a vehicle 112*a*, 112*b*, 112*c* performing an operation/action will be understood to be performed by one or more processors of the vehicle 112.

As briefly mentioned, each vehicle 112*a*, 112*b*, 112*c* may comprise one or more sensors that obtain sensor data associated with the respective environment. The sensors may include ultrasonic sensors to acoustically detect objects in the surroundings, lidar sensors, radar sensors, infra-red sensors, etc. Sensor data captured by the one or more sensors of a vehicle 112, may be processed by the vehicle 112*a*, 112*b*, 112*c* (such as by a perception component of the vehicle 112) to generate perception data for the vehicle 112. For example, the data from the one or more sensors may be fused or otherwise modified to generate perception data that represents one or more objects in the environment around the vehicle 112. The perception data may be used by a planning component of the vehicle 112*a*, 112*b*, 112*c* (discussed in more detail with reference to FIG. 9) which determines instructions for controlling operation of the vehicle 112*a*, 112*b*, 112*c* based on the perception data. In examples, perception data associated with each vehicle 112*a*, 112*b*, 112*c* may be sent or otherwise transmitted to the remote system 100.

Figure 9:
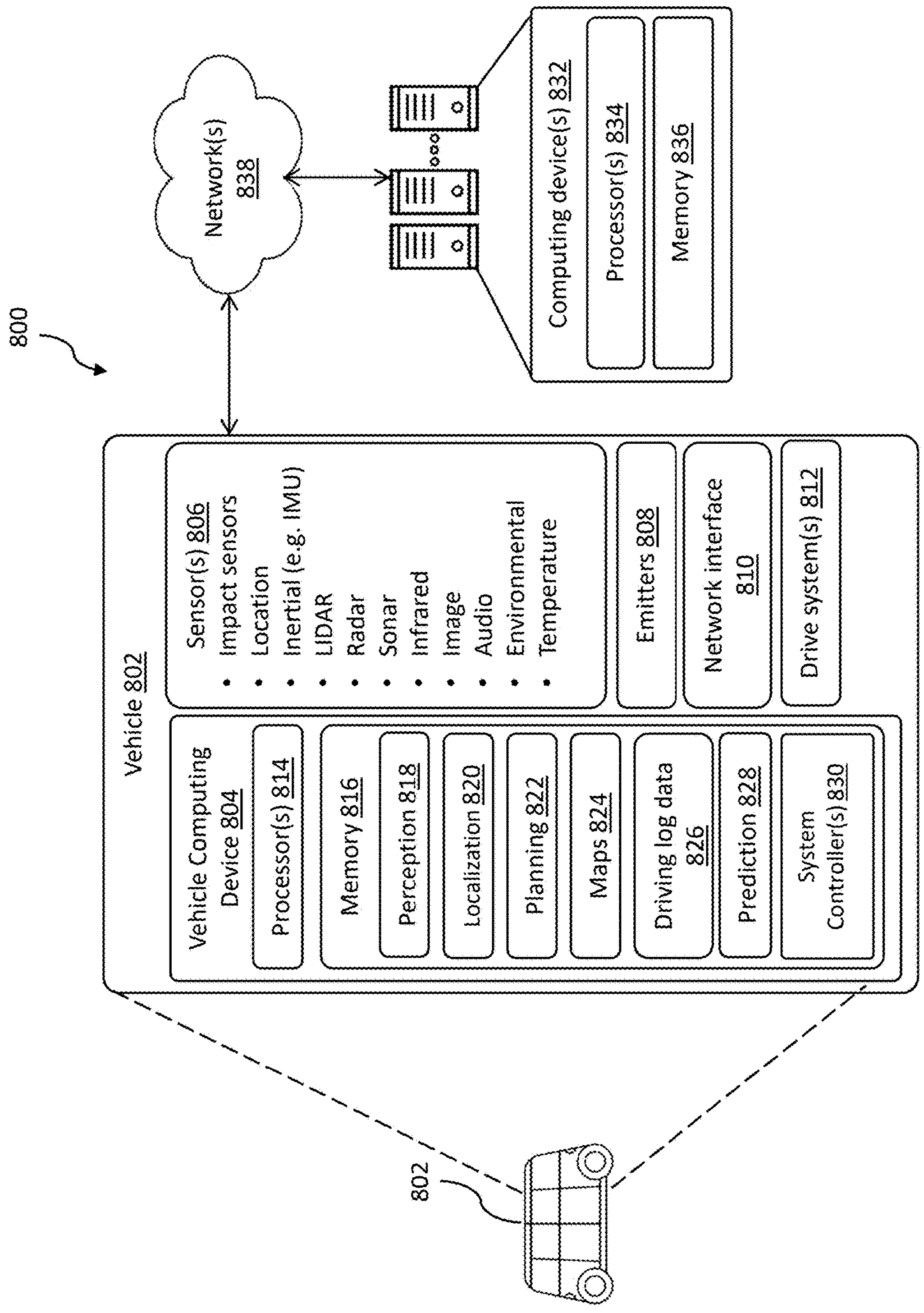
FIG. 9 is a block diagram of an example vehicle system.

Each vehicle 112*a*, 112*b*, 112*c* may also determine prediction data, where the prediction data is generated by a prediction component of the vehicle 112*a*, 112*b*, 112*c* (discussed in more detail in FIG. 9). The prediction data may form part of the perception data. In examples, the prediction data may be sent or otherwise transmitted to the remote system 100 via the network 114. For example, the prediction data may be transmitted to the system 100 as part of the perception data.

Stuck Vehicles

As mentioned, at certain times, a plurality of vehicles may simultaneously require assistance from an operator. For example, the three vehicles 112*a*, 112*b*, 112*c* of FIG. 1 may all require the assistance of the operator 108 at the same time (such as within the same time frame). Each vehicle may therefore transmit data to the system 100 and the system 100 may determine, based on the data, that the vehicles 112*a*, 112*b*, 112*c* require assistance. In a particular case, the plurality of vehicles 112*a*, 112*b*, 112*c* may all be stationary (as an example of "stuck") when assistance is requested from an operator 108. For example, the vehicles 112*a*, 112*b*, 112*c* may be unable to move (or it may be considered unsafe to move) until an input has been received from the operator 108.

In the example scenario of FIG. 1, the vehicles 112*a*, 112*b*, 112*c* all require assistance from the operator 108. For example, the vehicles 112*a*, 112*b*, 112*c* may have experienced a fault, contact with an object, or some other problem, or are unsure how to proceed next. The operator 108 may therefore be required to perform a task for each vehicle, such as: remotely control the vehicle, reset the vehicle, provide an input to the vehicle if a computing device on the vehicle requires confirmation from an operator, arrange for maintenance personnel to physically attend to the vehicle, allow passengers on board the vehicle to exit from the vehicle (when safe to do so), etc.

When multiple vehicles require assistance at the same time, it may be useful to prioritize the order in which the operator 108 attends to the vehicles 112*a*, 112*b*, 112*c* based on particular criteria. In the present disclosure, the system 100 determines a preferred order of attending to the vehicles 112*a*, 112*b*, 112*c* (and tasks) based on an urgency metric that is determined for each vehicle, and a length of time associated with the task that is required for each vehicle. An example will now be described by reference to the plurality of vehicles 112*a*, 112*b*, 112*c* of FIG. 1. It will be appreciated that although the following relates to three vehicles, the same principles may be applied and extended to any number of vehicles, such as two or more vehicles.

As mentioned, the system 100 is configured to determine a preferred order in which the operator 108 is to perform the tasks for the plurality of vehicles 112*a*, 112*b*, 112*c* based on the lengths of time associated with the tasks, and the urgency metrics associated with the plurality of vehicles.

In this example scenario, the system 100 determines for each of the plurality of vehicles 112*a*, 112*b*, 112*c* (or receives from the plurality of vehicles 112) an urgency metric. The urgency metric may take a value of between 0 and 0.5, for example. As discussed, in examples, the urgency metric for a vehicle 112*a*, 112*b*, 112*c* may be based on one or more factors, such as a location of the vehicle 112*a*, 112*b*, 112*c* (referred to herein as a "location metric" and having a value of between 0 and 0.5), the number of passengers inside the vehicle 112*a*, 112*b*, 112*c* (referred to herein as a "passenger metric" and having a value of between 0 and 0.5), and a contact metric for the vehicle (referred to herein as a "vehicle contact metric" and having a value of between 0 and 0.5).

The table in FIG. 2 depicts an example in which urgency metrics 202 are based on these three factors, but it will be appreciated that the urgency metrics may be based on fewer or more factors in other examples. In some cases, an urgency metric may be solely based on a vehicle contact metric, and in other cases, may not be based on a vehicle contact metric. In the example of FIG. 2, the urgency metric 202 for a vehicle 112*a*, 112*b*, 112*c* is an average (arithmetic mean) of the location metric 204 for the vehicle, the passenger metric 206 for the vehicle and the vehicle contact metric 208 for the vehicle. In other examples, the urgency metric 202 may be determined in another way, such as a weighted average or a sum of the metrics 204, 206, 208 or a maximum of the metrics 204, 206, 208. More generally, the urgency metric 202 for a vehicle 112*a*, 112*b*, 112*c* may be based on the location metric 204 for the vehicle, the passenger metric 206 for the vehicle and the vehicle contact metric 208 for the vehicle. In a particular example, the urgency metric 202 may be a weighted average of the metrics 204, 206, 208, where there is a higher weight assigned to the contact metric 208.

As shown in FIG. 2, the first vehicle 112*a* in this example is on a main road, with only one lane in the direction of travel of the vehicle. This gives rise to a location metric 204 (indicative of the location of the vehicle 112*a*) for this vehicle 112*a* of 0.3. The number of passengers in the first vehicle 112*a* is 2 passengers (out of a maximum of 5 possible passengers for example), and gives rise to a passenger metric 206 of 0.2. The objects around the first vehicle 112*a* include several other vehicles (some of which are stationary, and pedestrians), and results in a vehicle contact metric 208 of 0.25. A number of different methods and schemes may be used to determine the metrics 204, 206, 208.

As further shown in FIG. 2, the second vehicle 112*b* in this example is at an intersection, with only one lane in the direction of travel of the vehicle. This gives rise to a location metric 204 of 0.3. The number of passengers in the second vehicle 112*b* is 3 passengers (out of a maximum of 5 possible passengers), and gives rise to a passenger metric 206 of 0.3. The objects around the second vehicle 112*b* include several other vehicles and pedestrians, and results in a vehicle contact metric 208 of 0.4. The higher vehicle contact metric associated with second vehicle 112*b* compared to that of the first vehicle 112*a*, therefore means that the second vehicle 112*b* may be more likely to collide with or contact an object than the first vehicle 112*a*, for example.

As further shown in FIG. 2, the third vehicle 112*c* in this example is on a countryside road, with two lanes in the direction of travel of the vehicle. This gives rise to a location metric 204 of 0.1. The number of passengers in the third vehicle 112*c* is 1 passenger (out of a maximum of 5 possible passengers), and gives rise a passenger metric 206 of 0.1. There are no other vehicles or pedestrians around the third vehicle 112*c*, which results in a vehicle contact metric 208 of 0.1. The lower vehicle contact metric associated with third vehicle 112*c* compared to that of the first and second vehicles 112*a*, 112*b* therefore means that the third vehicle 112*c* may be less likely to collide with or contact an object than the first and second vehicles 112*a*, 112*b* for example.

Accordingly, based on the urgency metrics 202, it may be inferred that the task associated with the second vehicle 112*b* is the most urgent, since it has the highest urgency metric, and the task associated with the third vehicle 112*c* is the least urgent, since it has the lowest urgency metric.

The table in FIG. 2 also includes lengths of time associated with each of the tasks for the vehicles 112. The length of time taken to complete a task for vehicle n (where $0<n\leq N$ and N is the total number of tasks (and vehicles)) is: $T_{Task\_n}$. For example, due to the nature of the tasks and work involved, attending to the first vehicle 112*a* (and therefore task #1 associated with the first vehicle 112*a*) may take the operator 180 seconds ($T_{Task\_1}=180$), attending to the second vehicle 112*b* (and therefore task #2 associated with the second vehicle 112*b*) may take the operator 120 seconds ($T_{Task\_2}=120$), and attending to the third vehicle 112*c* (and therefore task #3 associated with the third vehicle 112*c*) may take the operator 60 seconds ($T_{Task\_3}=60$). The table in FIG. 3 shows that the total length of time for the operator to perform the tasks is 360 seconds (180+120+60).

As previously mentioned, it may also take an operator a period of time (known as a task switching time, $T_{SwitchingTask}$) to switch/move between tasks. In this example, $T_{SwitchingTask}=10$ seconds. For example, it may take an operator 10 seconds to navigate in a user interface, that is displayed on the one or more displays 106, from one task for a vehicle to another task for another vehicle. In this example, where there are 3 tasks, the operator will need to switch tasks twice (from the first task to the second task, and from the second task to the third task). The total length of time, $T_{Total}$, for the operator to complete the tasks (including the time to switch between tasks) is given by:

$$T_{Total} = \sum_{n=1}^{n=N} [T_{Task\_n}] + (N-1) * T_{SwitchingTask} = [180+120+60] + (2*10) = 380 \text{ seconds},$$

seconds, as also shown in FIG. 3.

Accordingly, based on the lengths of time 210, the task associated with the first vehicle 112*a* takes the operator the longest for the operator to perform, and the task associated with the third vehicle 112*c* takes the shortest for the operator to perform.

Preferred Order

As discussed earlier, the tasks associated with the plurality of vehicles may be performed in a plurality of different orders. The total number of different orders is given by N!, where N is the number of tasks/vehicles. In this example, there are 6 (N!=3!=3*2*1=6) different orders in which the operator may attend to the tasks. FIG. 4 shows how the tasks/vehicles may be arranged in each of the plurality of different orders 402. For example, for order #1 (also known as arrangement #1) the tasks may be ordered as follows: Task #1 (associated with the first vehicle 112*a*), followed by task #2 (associated with the second vehicle 112*b*), followed by task #3 (associated with the third vehicle 112*c*). If the operator 108 was to perform the tasks in accordance with order #1, the operator would perform the tasks sequentially and in that order.

To determine which of the plurality of different orders 402 is the preferred order (i.e., the order in which the operator 108 should attend to the vehicles and tasks), an order cost 404 may be determined for each order of the plurality of different orders 402. As mentioned, the order costs 404 may be based on: (i) the urgency metrics 202 associated with the plurality of vehicles 112, (ii) the lengths of time 210 associated with performing the tasks, and (iii) the order in which the tasks are to be performed.

In examples, the order cost for order i (where i is the order number and $0<i\leq N!$), may be determined by:

$$\text{Total\_Cost\_Arrangement}_i = \text{SUM}(\text{Cost\_AV}@j) \text{ for all } j, \quad 0 < j \leq N, \text{ where Cost\_AV}@j$$

is the task cost associated with the task at position j.

For example, for order #2 (i=2) shown in FIG. 4, $Total\_Cost\_Arrangement_2$=Cost_AV@1+Cost_AV@2+Cost_AV@3.

In order #2, for example, Cost_AV@3 is the task cost for the task associated with the second vehicle 112*b*, since task #2 (i.e., vehicle #2) is at position #3 in the order.

Furthermore, the task cost, Cost_AV@j, associated with each task/vehicle is based on the urgency metric associated with the vehicle/task and a resolution time T_Resolution_AV@m, for the task at position m in the order, where 0<m≤N.

The resolution time is the time taken for the task to be resolved (from a vehicle's perspective) and is based on: (i) the length of time associated with performing the task, T_Task_AV@m, and (ii) the cumulative length of time associated with performing prior tasks in the order. The resolution time for a task is therefore dependent upon the position in the order that the task is performed. The resolution time may be given by:

$$T\_Resolution\_AV@m=(m-1)*T\__{SwitchingTask}+SUM(T\_Task\_AV@j),\ \text{for all}\ i,0<j\leq m.$$

The task cost for a vehicle/task at position m may therefore be given by:

$$Cost\_AV@m = T\_Resolution\_AV@m * Urgency\_Metric\_AV@m.$$

Where Urgency_Metric_AV@m is the urgency metric associated with the vehicle at position m.

As an example, in order #2, the task cost for task #1 (for vehicle #1, i.e., the first vehicle 112*a*) at position #1 within the order, may be given by: 0.25*((1−1)*10+(180))=45, the task cost for task #3 (for vehicle #3, i.e., the third vehicle 112*c*) at position #2 within the order, may be given by: 0.1*((2-1)*10+(180+60))=25, and the task cost for task #2 (for vehicle #2, i.e., the second vehicle 112*b*) at position #3 within the order, may be given by: 0.33*((3-1)*10+(180+60+120))=125.4. The order cost associated with order #2 may therefore be given by: 45+25+125.4.

Order costs for the other orders of the plurality of different orders may be determined in the same way.

A preferred order may be the order having the lowest order cost. In this particular example, the order having the lowest order cost is order #3, meaning that the operator attends to the second vehicle 112*b* first, followed by the third vehicle 112*c*, followed by the first vehicle 112*a*.

Updated Preferred Order

In examples, after the preferred order has been determined, an additional vehicle may require assistance (that is, additional to the original plurality of vehicles 112*a*, 112*b*, 112*c* associated with the preferred order of tasks). Accordingly, there may therefore be an additional task associated with the additional vehicle for the operator 108 to perform. In such cases, rather than repeating the above process for the updated plurality of vehicles (the updated plurality of vehicles including the original plurality of vehicles plus the additional vehicle), it may be more computationally efficient to add the additional task/vehicle into the previously determined preferred order at a particular position. Accordingly, what is to be determined is where in the preferred order the additional task is to be performed.

Continuing with the example above, there may be a fourth vehicle and fourth task (vehicle #4 and task #4) that needs to be performed by the operator 108, in addition to the 3 tasks that already need to be performed. The fourth vehicle and task may also be associated with an urgency metric and length of time, in the same way as discussed above. In this example, there are 4 different places/positions in which the fourth task/vehicle can be added to the preferred order. FIG. 5 shows the different orders 504 in which the tasks can be performed. Each of these orders may be referred to as updated preferred orders, and thus there are a plurality of updated preferred orders 502.

As shown in FIG. 5, each of the plurality of updated preferred orders 502 have the tasks in the same order as in the preferred order, but also include the additional task at a particular position within the preferred order. In this example, the preferred order had 3 tasks in the following order: task #2 (associated with vehicle #2), task #3 (associated with vehicle #3) and task #1 (associated with vehicle #1). As an example, the second of the updated preferred orders has the 4 tasks in the following order: task #2 (associated with vehicle #2), task #4 (associated with vehicle #4), task #3 (associated with vehicle #3) and task #1 (associated with vehicle #1). The original tasks remain in the same order (relative to each other), and the additional task is included at a particular position in the preferred order. The same is true for the other updated preferred orders.

Determining where in the preferred order the additional task is to be performed may comprise determining a plurality of updated preferred orders 502, where the plurality of updated preferred orders 502 have the tasks associated with the plurality of vehicles 112*a*, 112*b*, 112*c* arranged in the same order as in the preferred order and the additional task associated with the additional vehicle arranged at different positions within the preferred order.

One of the plurality of updated preferred orders may be selected for the operator 108. The selected order may be referred to as an updated preferred order (or a selected updated preferred order). In examples, an order cost may be determined for the plurality of updated preferred orders 502, and the order cost having the lowest order cost may then selected.

Accordingly, in the same way as discussed above, an order cost may be determined for each of the plurality of updated orders 502. The order costs may be based on: (i) the urgency metrics associated with the plurality of vehicles 112*a*, 112*b*, 112*c* and an urgency metric associated with the additional vehicle, (ii) the lengths of time associated with performing the tasks and a length of time associated with performing the additional task, and (iii) the order in which the tasks in the updated preferred order are to be performed.

In examples, the order cost for order i (where i is the order number and 0<i≤N, where N=4 in this example), may be determined in the same way as discussed above:

$$Total\_Cost\_Arrangement_i = SUM(Cost\_AV@j)\ \text{for all}\ j,\ 0 < j \leq N,\ \text{where}\ Cost\_AV@j$$

is the task cost associated with the task at position j.

For example, for order #2 (i=2) of the updated plurality of orders 502 shown in FIG. 5, $$Total\_Cost\_Arrangement_2 = Cost\_AV@1 + Cost\_AV@2 + Cost\_AV@3 + Cost\_AV@4.$$

In order #2, for example, Cost_AV@4 is the task cost for the task associated with the first vehicle 112*a*, since task #1 (i.e., vehicle #1) is at position #4 in the order.

Furthermore, the task cost, Cost_AV@j, associated with each task/vehicle is based on the urgency metric associated with the vehicle/task and a resolution time T_Resolution_AV@m, for the task at position m in the order, where 0<m≤N. As mentioned earlier, the resolution time may be given by:

$$T\_\text{Resolution}\_AV@m=(m-1)*T\_\text{Switching\_Task}+\text{SUM}(T\_\text{Task}\_AV@j),\text{ for all } i, 0<j\leq m.$$

As mentioned above, the task cost for a vehicle/task at position m may therefore be given by:

$$\text{Cost\_AV}@m=\text{T\_Resolution\_AV}@m*\text{Urgency\_Metric\_AV}@m.$$

Where Urgency_Metric_AV@m is the urgency metric associated with the vehicle at position m.

Order costs for each of the plurality of updated preferred orders 502 may therefore be determined in the same way as discussed above.

One of the updated preferred orders may be selected based on the order costs. For example, the selected updated preferred order may be the order having the lowest order cost. The operator 108 then attends to the vehicles/tasks in order indicated in the selected updated preferred order.

An order cost may be determined for the plurality of updated preferred orders 502, rather than for all of the possible orders in which the tasks could be performed. In this example, there are 4 updated preferred orders because the additional task/vehicle can be added into the preferred order, which itself contains 3 tasks/vehicles, in 4 different places. This can be contrasted with the total number of possible orders in which the 4 tasks could be arranged if the 3 original tasks were not restricted to being in the same order relative to each other. More particularly, as discussed earlier, the total number of ways in which tasks can be ordered is given by N!, where N is the number of tasks/vehicles. In this example, there are 4 (N!=4!=4*3*2*1=24) different orders in which the operator could attend to the 4 tasks. Accordingly, when an additional task is to be performed after the preferred order has already been determined, it may be more computationally efficient to determine order costs only for the plurality of updated preferred orders, rather than all possible orders. In this example, this would result in only 4 order costs being determined, rather than 24. It may therefore be that order selected from the 4 order costs is not the actual order having the lowest overall cost, but this process provides a balance between processing efficiency and the requirements of the vehicles and operator.

Multiple Operators

In examples, rather than having just a single operator perform the tasks and attend to the vehicles, there may be a plurality of operators available to address the needs of the vehicles. In such cases, the plurality of operators can work in parallel on the vehicles. An example of how this may be achieved will be described.

In an example, there may be N vehicles requiring assistance and M available operators, where N>M. In the same way as described above for a single operator, a preferred order for attending the vehicles/tasks may be determined. From here, the first M vehicles/tasks in the preferred order can be distributed to the M operators so that the M most important vehicles/tasks can be worked on in parallel.

As an example, the first vehicle in the preferred order (AV@1) may be assigned to a first operator (TO1), the second vehicle (AV@2) may be assigned to a second operator (TO2) and so on, until the Mth vehicle (AV@M) is assigned to TOM.

From here, the vehicle at position M+1 in the preferred order (AV@(M+1)) is assigned to the operator that has the smallest total resolution time, T_Total_Resolution, where the total resolution time is based on the resolution time of all vehicles already in the queue of that operator. For example, if there is only one task/vehicle in the queue for that operator, then the total resolution time for that operator is equal to the length of time associated with performing the task, or in some cases, equal to the length of time associated with performing the task and the task switching time. The total resolution time for each operator is therefore based on the cumulative length of time associated with performing tasks currently assigned to an operator. The total resolution time is therefore similar to $T_{Total}$ described earlier. By assigning the next task/vehicle to that particular operator, the waiting time for the vehicle to be addressed by the operator is reduced.

The same process can be repeated for allocating the vehicle at position M+2 in the preferred order (AV@(M+2)). As before, this vehicle can be assigned to the operator with the smallest total resolution time.

In examples, the total resolution times computed for each operator at each round in the process can be stored in memory and be reused in the next round to expedite the calculation. For example, the total resolution time would only need to be updated for the queue of an operator that has been assigned an additional vehicle in the previous round.

As an example, it may be assumed that N=8 (AV1 to AV8) and M=4 (TO1 to TO4). In this example, the lengths of time taken to complete the tasks for the vehicles, $T_{Task\_n}$ are as follows (in seconds): $T_{Task\_1}=30$, $T_{Task\_2}=40$, $T_{Task\_3}=50$, $T_{Task\_4}=60$, $T_{Task\_5}=100$, $T_{Task\_6}=120$, $T_{Task\_7}=180$, $T_{Task\_8}=240$.

Furthermore, in this example, $T_{SwitchingTask}=30$ s.

Following the earlier described process, it may be assumed that the preferred order for performing the tasks (assuming one operator) is as follows: AV3, AV5, AV2, AV7, AV8, AV4, AV1, AV6.

Accordingly, the process may start with allocating the first M (in this case four) vehicles to the operators in the following manner: TO1 receives AV3, TO2 receives AV5, TO3 receives AV2 and TO4 receives AV7.

To determine which operator is assigned vehicle M+1 (in this case AV8), the algorithm calculates the total resolution time for the queue of each operator. For example, for TO1, the total resolution time is 50 s, for TO2 total resolution time is 100 s, for TO3 the total resolution time is 40 s and for TO4 the total resolution time is 180 s.

As mentioned, the vehicle at position M+1 in the preferred order (AV8) is assigned to the operator that has the smallest total resolution time. In this case, AV8 is assigned to TO3.

For deciding on AV4 (the next vehicle in the preferred order), the algorithm again calculates (or receives from memory) the total resolution time for the queue of each operator. For example, for TO1, the total resolution time is 50 s, for TO2 total resolution time is 100 s, for TO3 the total resolution time is 40 s+30 s+240 s=310 s (so includes the task switching time), and for TO4 the total resolution time is 180 s. In this case, AV4 is assigned to TO1.

For deciding on AV1 (the next AV in the arrangement), the algorithm again calculates (or receives from memory) the total resolution time for the queue of each operator. For example, for TO1, the total resolution time is 50 s+30 s+60 s=140 s, for TO2 total resolution time is 100 s, for TO3 the total resolution time is 40 s+30 s+240 s=310 s, and for TO4 the total resolution time is 180 s. In this case, AV1 is assigned to TO2.

For deciding on AV6 (the next AV in the arrangement), the algorithm again calculates (or receives from memory) the total resolution time for the queue of each operator. For example, for TO1, the total resolution time is 50 s+30 s+60 s=140 s, for TO2 total resolution time is 100 s+30 s+30 s=160 s, for TO3 the total resolution time is 40 s+30 s+240 s=310 s, and for TO4 the total resolution time is 180 s. In this case, AV6 is assigned to TO1.

The results in the final distribution as: TO1 is assigned vehicles: AV3, AV4, AV6. TO2 is assigned vehicles: AV5, AV1. TO3 is assigned vehicles: AV2, AV8. TO4 is assigned vehicle: AV7.

In examples, an additional vehicle may require assistance (that is, additional to the original 8 vehicles). Accordingly, there may therefore be an additional task associated with the additional vehicle for the operators to perform.

In the same way as described above for a single operator, the preferred order of tasks/vehicles may be updated to include the additional task/vehicle.

Continuing with this example, a ninth vehicle (AV9) may require assistance. The updated preferred order may be determined as follows: AV3, AV5, AV2, AV7, AV8, AV4, AV9, AV1, AV6.

In this example, the first six vehicles that have been allocated to operators will remain the same, while the process needs to be repeated for allocating AV9, AV1, AV6. These vehicles can be assigned in the same fashion as discussed before by determining the total resolution time for the queues of each operator. In this example, the first six vehicles may have been allocated to the operators as follows: TO1 has been allocated AV3, AV4, TO2 has been allocated AV5, TO3 has been allocated AV2, AV8 and TO4 has been allocated AV7.

For deciding on AV9 (the next AV in the arrangement), the algorithm calculates (or receives from memory) the total resolution time for the queue of each operator. In the same way as discussed above, this may result in AV9 being assigned to TO2. The process can again be repeated for AV1 and AV6.

Additional Operators

In examples, it may be useful to determine or estimate the time that each vehicle has to wait to be addressed by an operator. For example, for a vehicle second in a queue for a particular operator, the time taken for the task associated with the vehicle to be completed (i.e., its resolution time) will be based on the length of time associated with performing the task for the vehicle and the cumulative length of time associated with performing prior tasks in the queue. The resolution time may further include at least one task switching time.

In examples, it may additionally or alternatively be useful to determine or estimate the time for each operator to address all the tasks for the vehicles that are allocated to the operator's queue.

These may be initial estimates that can be modified based on the actual finish time to provide a more accurate estimate.

Additional criteria may be determined in examples. For example, at least one of: (i) a maximum tolerable waiting time for any vehicle or (ii) a maximum tolerable task load time for any operator. As an example, the maximum tolerable waiting time for any vehicle may be set as 300 s, meaning that no vehicle should wait for longer than 300 s to have been addressed by an operator. The maximum tolerable task load time for any operator may be the maximum tolerable time taken for an operator to address all the tasks for the vehicles that are allocated to the operator's queue.

In examples, these criteria and the estimates can be used to determine whether or not one or more additional operators are required to attend to the vehicles.

As an example, it may be assumed that the time that each vehicle has to wait to be addressed by an operator should be less than maximum tolerable waiting time for any vehicle. Continuing with the example above this may mean that no vehicle should wait for more than 300 s to have been addressed. The following algorithm may be used to determine the minimum number of operators required:

Step 1. Determine the preferred order for performing the tasks, as described earlier. In some examples, Step 1 may further include initializing a variable: TO_needed=current number of operators available, where TO_needed is the number of operators needed to address the vehicles.

Step 2. Distribute the tasks/vehicles among the operators using the algorithm described above for "Multiple Operators".

Step 3. For each vehicle/task, calculate the time that each vehicle has to wait to be addressed by an operator.

Step 4. If, for any of the vehicles/tasks, the time that the vehicle has to wait to be addressed by an operator exceeds the maximum tolerable waiting time for any vehicle, then the number of operators needed should be increased, such as by one. For example, TO_needed=TO_needed+1. In examples, step 4 may involve determining, among all of the vehicles, the highest/maximum time that a vehicle has to wait to be addressed by an operator and comparing this to the maximum tolerable waiting time, rather than performing the calculation for each task/vehicle.

Step 5: If further operators are needed, then Steps 2-4 can be repeated (and Step 5, if further operators are still needed). The steps are repeated until, for all of the vehicles/tasks, the time that the vehicles have to wait to be addressed by an operator is less the maximum tolerable waiting time for any vehicle. For example, the steps are repeated until the maximum waiting time among the vehicles is below the maximum tolerable waiting time, such as 300 s.

Continuing with the earlier described example comprising 8 vehicles, FIG. 6A depicts an example table allocating tasks to a number of operators, in this case 4 operators. The times shown in the columns Estimated Start Time corresponds to the time that the vehicle has to wait to be addressed by an operator. As shown, vehicle AV8 is the vehicle with the highest time that the vehicle has to wait to be addressed by an operator (in this case Operator 3). In this example, the time is 310 s. This then exceeds the maximum tolerable waiting time of 300 s, meaning that an additional operator is required, and the tasks/vehicles need to be redistributed, as mentioned above.

FIG. 6B depicts an updated distribution with an additional operator. In this example, vehicle AV6 is the vehicle with the highest time that the vehicle has to wait to be addressed by an operator (in this case Operator 2). In this example, the time is 250 s. This then is less than the maximum tolerable waiting time for any vehicle of 300 s, so no further operators are required.

It will be appreciated that the same algorithm and process can be achieved using a maximum tolerable task load time for any operator rather than a maximum tolerable waiting time for any vehicle.

Contact Metric

As discussed above, an urgency metric may be based on a vehicle contact metric. In examples, each vehicle 112*a*, 112*b*, 112*c* may determine its own vehicle contact metric and transmit the vehicle contact metric (and/or an urgency metric based on the vehicle contact metric) to the remote system 100. In other examples, the system 100 may itself determine the vehicle contact metrics associated with the vehicles 112, such as based on perception data received from the vehicles 112.

As mentioned above, a vehicle contact metric for a vehicle may be based on perception data generated by the vehicle, where the perception data may be associated with one or more objects in the environment around the vehicle. In examples, the vehicle contact metric may be based on one or more object contact metrics. For example, the vehicle contact metric may be a sum, average, weighted average or maximum of the object contact metrics for one or more objects in the environment around the vehicle.

As an example, FIG. 7 depicts perception data that may be determined or generated by a particular vehicle 112*a*, 112*b*, 112*c* based on sensor data obtained by one or more sensors of the vehicle 112. In this example, the perception data in FIG. 7 has been generated by the second vehicle 112*b* of FIG. 1, and is based on the 9 objects in the vicinity of the second vehicle 112*b*.

In the table of FIG. 7, each row is associated with a different object in the environment, and each column corresponds to a characteristic associated with the objects. In this example, the characteristics include: an object number, a, (or other unique identifier associated with the object), a classification or object type, a current location of the object in the environment, a velocity, a predicted future location of the object, and an object contact metric, $\phi_a$. Each object contact metric $\phi_a$ is based on a probability of contact (such as a collision) between the vehicle and the object a. It will be understood that in other examples there may be fewer or greater numbers of objects and/or fewer or greater numbers of characteristics associated with each object. In examples, the objects may be associated with a different number of characteristics depending on the object.

An object contact metric for an object may be determined/calculated based on the sensor data obtained by the sensor(s) on the vehicle, and/or be determined based on other perception data generated by the vehicle 112.

In examples, an object contact metric for each object may be determined/calculated based on: (i) a potential future path/trajectory or location of the object, and (ii) an action or an intended action of the vehicle 112. For example, an action or intended action for the vehicle 112*a*, 112*b*, 112*c* may be represented by a path or trajectory of the vehicle 112.

FIG. 1, for example, depicts a trajectory 116 of the second vehicle 112*b*, which the vehicle 112*b* may have been following, may currently be following, or may follow in the near future. Although not illustrated in FIG. 1, a future path or location of each object may also be determined. For example, a prediction component of the vehicle 112*b* may determine a future path or location of each object based on a current location and velocity of the object. The prediction component of the vehicle 112*b* may determine more than one future path or location of each object. Each future path or location may be associated with a probability. For example, an object may be more likely to follow one path in the future, rather than another path.

Based on the future path or location of an object, and the action or intended action of the vehicle, the vehicle 112*b* can determine a probability of the object and vehicle 112*b* colliding/contacting in the future. For example, if the future path 116 of the vehicle 112*b* intersects a future path of an object, there may be a higher probability of a contact than if the paths do not intersect. If the future path 116 of the vehicle 112*b* does not intersect a future path of an object, it may be determined that the object and vehicle are unlikely or not likely to contact each other.

Once an object contact metric has been determined for each object, a vehicle contact metric for the vehicle 112*b* can be determined. A vehicle contact metric may be based on the overall probability of collision between the vehicle and the objects within the fields of view of the sensors of the vehicle. A vehicle contact metric may therefore be based on the object contact metrics. For example, a vehicle contact metric may be based on an average, sum or maximum of the object contact metrics associated with the objects within the fields of view of the sensors of the vehicle. Following on from the above example, the vehicle contact metric for the second vehicle 112*b* may equal 0.4 (shown in FIG. 2) based on the object contact metrics $\phi_a$ of FIG. 7.

It will be appreciated that a variety of different techniques may be used to determine a vehicle and/or object contact metric. In examples, an object contact metric may be based on a probability of the object and vehicle colliding/contacting in the future, and a severity of the contact. The severity may be based on the type of object, such as whether the object is a vehicle, pedestrian etc. In some cases, an object contact metric is not based on a severity of the contact.

In general terms, a vehicle contact metric for a vehicle may be given by:

$$\phi_{vehicle} = \sum_{a \in \{objects\}} \phi_a = \sum_{a \in \{objects\}} \text{function } (w_{type}(x_a), P_{contact}(x_a, x_h), S_{contact}(x_a, x_h))$$

Where $\phi_{vehicle}$ is the vehicle contact metric, $\phi_a$ is an object contact metric, $w_{type}(x_a)$ is a weight of each object type, $P_{contact}(x_a, x_h)$ is a probability of the object and vehicle colliding/contacting and $S_{contact}(x_a, x_h)$ is a severity of the collision/contact between the object and vehicle. The vehicle contact metric may therefore be a function of these terms.

As a more specific example, a vehicle contact metric may be given by:

$$\phi_{vehicle} = \sum_{a \in \{objects\}} w_{type}(x_a) * [(w_{contact\_probability} * P_{contact}(x_a, x_h)) + (w_{contact\_severity} * S_{contact}(x_a, x_h))]$$

Where $w_{contact\_probability}$ is the weight of the contact probability in the contact metric, and $w_{contact\_severity}$ is the weight of the contact severity in the contact metric. The weights of the object type, contact probability and contact severity can be arbitrarily chosen. It will be appreciated that this a particular example of a vehicle contact metric, and other examples are envisaged.

Vehicle contact metrics may be determined for each vehicle 112a, 112b, 112c in the same way. Accordingly, an urgency metric may be determined for each vehicle 112a, 112b, 112c based on the vehicle contact metrics associated with each respective vehicle 112, as discussed above.

Figure 8:
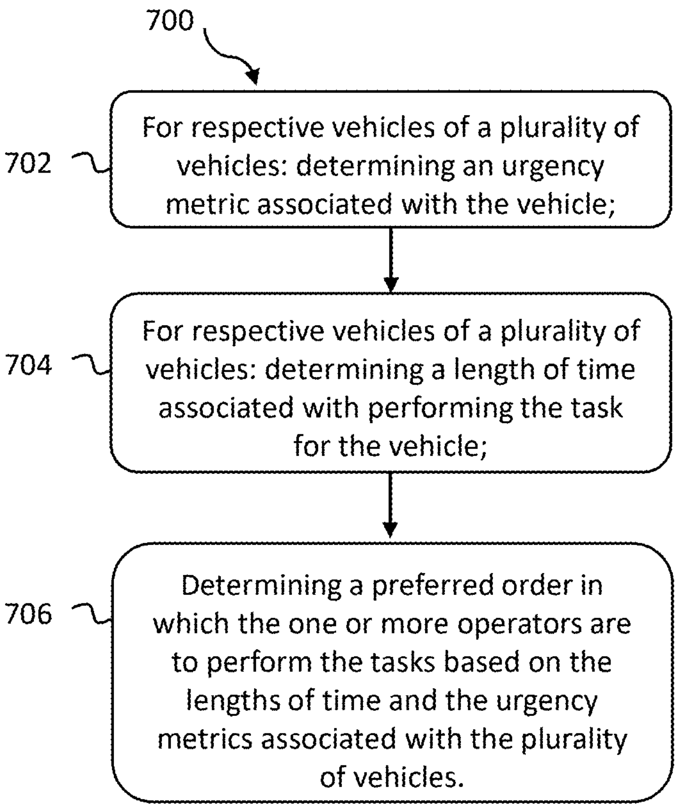
FIG. 8 depicts a flow chart of a method according to an example.

FIG. 8 illustrates a flow chart of an example method 700. The example method 700 may be implemented by the system 100 alone, or by the vehicles 112a, 112b, 112c and the system 100. In examples, the method 700 may be encoded and stored as instructions on one or more non-transitory computer-readable media that, when executed by the one or more processors, cause the system 100 or system 100 and vehicles 112a, 112b, 112c to implement the method 700. In examples, the method is a computer implemented method.

As can be seen in FIG. 8, the method/process 700 may comprise, at step 702, for each vehicle (or for respective vehicles) of a plurality of vehicles 112, determining an urgency metric associated with the vehicle, the urgency metric being indicative of urgency in which to perform a task associated with the vehicle. The method/process 700 may comprise, at step 704, for each vehicle (or for respective vehicles) of a plurality of vehicles 112, determining a length of time associated with performing the task for the vehicle. Steps 702 and 704 may be performed by the vehicles 112a, 112b, 112c themselves, or by the system 100, for example. The method/process 700 may comprise, at step 706, determining a preferred order in which the one or more operators are to perform the tasks based on the lengths of time and the urgency metrics associated with the plurality of vehicles. Step 706 may be performed by the system 100, for example.

FIG. 9 illustrates a block diagram of an example system 800 that implements the techniques discussed above and herein. The example system 800 may include a vehicle 802, which may represent any of the vehicles 112a, 112b, 112c of FIG. 1. In some instances, the vehicle 802 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 802 may be a fully or partially autonomous vehicle having any other level or classification. Moreover, in some instances, the techniques described herein may be usable by non-autonomous vehicles as well.

The vehicle 802 may include a vehicle computing device (s) 804, sensor(s) 806, emitter(s) 808, network interface(s) 810, and/or drive system(s) 812. Sensor(s) 806 may represent sensor(s) discussed above.

In some instances, the sensor(s) 806 may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 806 may include multiple instances of each of these or other types of sensors. For instance, the radar sensors may include individual radar sensors located at the corners, front, back, sides, and/or top of the vehicle 802. As another example, the cameras may include multiple cameras disposed at various locations about the exterior and/or interior of the vehicle 802. The sensor(s) 806 may provide input to the vehicle computing device(s) 804 and/or to computing device(s) 832.

Data captured by sensor(s) may be known as sensor data.

The vehicle 802 may also include emitter(s) 808 for emitting light and/or sound. The emitter(s) 808 may include interior audio and visual emitter(s) to communicate with passengers of the vehicle 802. Interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 808 may also include exterior emitter(s). Exterior emitter(s) may include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 802 may also include network interface(s) 810 that enable communication between the vehicle 802 and one or more other local or remote computing device(s). The network interface(s) 810 may facilitate communication with other local computing device(s) on the vehicle 802 and/or the drive component(s) 812. The network interface(s) 810 may additionally or alternatively allow the vehicle to communicate with other nearby computing device(s) (e.g., other nearby vehicles, traffic signals, etc.). The network interface (s) 810 may additionally or alternatively enable the vehicle 802 to communicate with computing device(s) 832 over a network 838. In some examples, computing device(s) 832 may comprise one or more nodes of a distributed computing system (e.g., a cloud computing architecture). The computing device(s) 832 corresponds to remote system 100, discussed above.

The vehicle 802 may include one or more drive components 812. In some instances, the vehicle 802 may have a single drive component 812. In some instances, the drive component(s) 812 may include one or more sensors to detect conditions of the drive component(s) 812 and/or the surroundings of the vehicle 802. By way of example and not limitation, the sensor(s) of the drive component(s) 812 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 812. In some cases, the sensor(s) on the drive component(s) 812 may overlap or supplement corresponding systems of the vehicle 802 (e.g., sensor(s) 806).

The drive component(s) 812 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 812 may include a drive component controller which may receive and pre-process data from the sensor(s) and to control operation of the various vehicle systems. In some instances, the drive component controller may include one or more processors and memory communicatively coupled with the one or more processors. The memory may store one or more components to perform various functionalities of the drive component(s) 812. Furthermore, the drive component(s) 812 may also include one or more communication connection(s) that enable communication by the respective drive component with one or more other local or remote computing device(s).

The vehicle computing device(s) 804 may include processor(s) 814 and memory 816 communicatively coupled with the one or more processors 814. Computing device(s) 832 may also include processor(s) 834, and/or memory 836. The processor(s) 814 and/or 834 may be any suitable processor capable of executing instructions to process data and perform operations as described herein. By way of example and not limitation, the processor(s) 814 and/or 834 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 816 and/or 836 may be examples of non-transitory computer-readable media. The memory 816 and/or 836 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), non-volatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 816 and/or memory 836 may store a perception component 818, localization component 820, planning component 822, map(s) 824, driving log data 826, prediction component 828, and/or system controller(s) 830—zero or more portions of any of which may be hardware, such as GPU(s), CPU(s), and/or other processing units.

The perception component 818 may detect object(s) in in an environment surrounding the vehicle 802 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 818 is referred to as perception data. The perception component 818 may be configured to associate a bounding region (or other indication) with an identified object. The perception component 818 may be configured to associate a confidence score associated with a classification of the identified object with an identified object. In some examples, objects, when rendered via a display, can be colored based on their perceived class. The object classifications determined by the perception component 818 may distinguish between different object types such as, for example, a passenger vehicle, a pedestrian, a bicyclist, motorist, a delivery truck, a semi-truck, traffic signage, and/or the like. The perception component 818 may detect the objects based on sensor data received from the sensors 806.

In at least one example, the localization component 820 may include hardware and/or software to receive data from the sensor(s) 806 to determine a position, velocity, and/or orientation of the vehicle 802 (e.g., one or more of an x-, y-, z-position, roll, pitch, or yaw). For example, the localization component 820 may include and/or request/receive map(s) 824 of an environment and can continuously determine a location, velocity, and/or orientation of the autonomous vehicle 802 within the map(s) 824. In some instances, the localization component 820 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 820 may provide data to various components of the vehicle 802 to determine an initial position of an autonomous vehicle for generating a trajectory and/or for generating map data, as discussed herein. In some examples, localization component 820 may provide, to the perception component 818, a location and/or orientation of the vehicle 802 relative to the environment and/or sensor data associated therewith.

The planning component 822 may receive a location and/or orientation of the vehicle 802 from the localization component 820 and/or perception data from the perception component 818 and may determine instructions for controlling operation of the vehicle 802 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 830 and/or drive component(s) 812 may parse/cause to be carried out, second instructions for the emitter(s) 808 may be formatted according to a second format associated therewith).

The driving log data 826 may comprise sensor data, perception data, and/or scenario labels collected/determined by the vehicle 802 (e.g., by the perception component 818), as well as any other message generated and or sent by the vehicle 802 during operation including, but not limited to, control messages, error messages, etc. In some examples, the vehicle 802 may transmit the driving log data 826 to the computing device(s) 832.

The prediction component 828 may generate one or more probability maps representing prediction probabilities of possible locations of one or more objects in an environment. For example, the prediction component 828 may generate one or more probability maps for vehicles, pedestrians, animals, and the like within a threshold distance from the vehicle 802. In some examples, the prediction component 828 may measure a track of an object and generate a discretized prediction probability map, a heat map, a probability distribution, a discretized probability distribution, and/or a trajectory for the object based on observed and predicted behavior. In some examples, the one or more probability maps may represent an intent of the one or more objects in the environment. In some examples, the planning component 822 may be communicatively coupled to the prediction component 828 to generate predicted trajectories of objects in an environment. For example, the prediction component 828 may generate one or more predicted trajectories for objects within a threshold distance from the vehicle 802. In some examples, the prediction component 828 may measure a trace of an object and generate a trajectory for the object based on observed and predicted behavior. Although prediction component 828 is shown on a vehicle 802 in this example, the prediction component 828 may also be provided elsewhere, such as in a remote computing device. In some examples, a prediction component may be provided at both a vehicle and a remote computing device. These components may be configured to operate according to the same or a similar algorithm. Data generated by the prediction component 828 may be provided to the computing device(s) 832 as perception part of the perception data. The perception data may be used by the planning component 822 to navigate in the environment.

The memory 816 and/or 836 may additionally or alternatively store a mapping system, a planning system, a ride management system, etc. Although perception component 818 and/or planning component 822 are illustrated as being stored in memory 816, perception component 818 and/or planning component 822 may include processor-executable instructions, machine-learned model(s) (e.g., a neural network), and/or hardware.

As described herein, the localization component 820, the perception component 818, the planning component 822, and/or other components of the system 800 may comprise one or more ML models. For example, the localization component 820, the perception component 818, and/or the planning component 822 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD)), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, which is incorporated in its entirety herein), and/or VoxelNet. Architecture latency optimizations may include MobilenetV2, Shufflenet, Channelnet, Peleenet, and/or the like. The ML model may comprise a residual block such as Pixor, in some examples.

Memory 820 may additionally or alternatively store one or more system controller(s) 830, which may be configured to control steering, propulsion, braking, safety, emitters, communication, and other systems of the vehicle 802. These system controller(s) 830 may communicate with and/or control corresponding systems of the drive component(s) 812 and/or other components of the vehicle 802.

It should be noted that while FIG. 9 is illustrated as a distributed system, in alternative examples, components of the vehicle 802 may be associated with the computing device(s) 832 and/or components of the computing device(s) 832 may be associated with the vehicle 802. That is, the vehicle 802 may perform one or more of the functions associated with the computing device(s) 832, and vice versa.

Example Clauses

1. A system comprising:

one or more processors; and one or more non-transitory computer readable media having instructions stored thereon which, when executed by the one or more processors, cause the one or more processors to perform operations comprising:

for respective vehicles of a plurality of vehicles:

determining or receiving an urgency metric associated with the vehicle, the urgency metric being indicative of an urgency in which to perform a task associated with the vehicle, and based on a contact metric associated with the vehicle, the contact metric being based on a probability of the vehicle contacting one or more objects in an environment around the vehicle; and determining or receiving a length of time associated with performing the task for the vehicle, the task being performed by an operator of one or more operators, the one or more operators being located remote from the plurality of vehicles and being responsible for monitoring and/or controlling the plurality of vehicles; and determining a preferred order in which the one or more operators are to perform the tasks based on the lengths of time and the urgency metrics associated with the plurality of vehicles.

2. The system of clause 1, wherein determining a preferred order in which the one or more operators are to perform the tasks, comprises:

determining a plurality of different orders in which the one or more operators can perform the tasks associated with the plurality of vehicles;

for respective orders of the plurality of different orders, determining an order cost associated with the order, the order cost being based on: (i) the urgency metrics associated with the plurality of vehicles, (ii) the lengths of time associated with performing the tasks, and (iii) the order in which the tasks are to be performed; and selecting, based on the order costs, the preferred order from the plurality of different orders.

3. The system of clause 2, wherein after selecting the preferred order, the operations further comprise:

determining that an additional task associated with an additional vehicle is required to be performed by the one or more operators; and determining where in the preferred order the additional task is to be performed.

4. The system of clause 2 or 3, wherein for respective orders of the plurality of different orders, determining an order cost associated with the order comprises:

determining for respective tasks in the order:

a resolution time based on: (i) the length of time associated with performing the task, and (ii) the cumulative length of time associated with performing prior tasks in the order; and a task cost based on: (i) the resolution time, and (ii) the urgency metric associated with the vehicle;

wherein the order cost associated with the order is based on a sum of the task costs for the order.

5. The system of clause 4, wherein the resolution time is further based on at least one task switching time, the task switching time being indicative of a time taken for an operator to switch from one task to another task.

6. The system of any preceding clause, wherein the urgency metric associated with the vehicle is further based on one or more of:

one or more characteristics of one or more passengers in the vehicle;

traffic conditions;

a time of day;

a location of the vehicle; or a type of fault associated with the vehicle.

7. A method, comprising:

for respective vehicles of a plurality of vehicles:

determining an urgency metric associated with the vehicle, the urgency metric being indicative of urgency in which to perform a task associated with the vehicle; and determining a length of time associated with performing the task for the vehicle, the task being performed by an operator of one or more operators, the one or more operators being located remote from the plurality of vehicles and being responsible for monitoring and/or controlling the plurality of vehicles; and determining a preferred order in which the one or more operators are to perform the tasks based on the lengths of time and the urgency metrics associated with the plurality of vehicles.

8. The method of clause 7, further comprising:

for respective vehicles of the plurality of vehicles:

determining a contact metric associated with the vehicle, the contact metric being based on the probability of the vehicle contacting one or more objects in an environment around the vehicle;

wherein determining an urgency metric associated with the vehicle comprises determining the urgency metric based on the contact metric associated with the vehicle.

9. The method of clause 7 or 8, wherein determining an urgency metric associated with the vehicle comprises determining the urgency metric based on one or more of:

one or more characteristics of one or more passengers in the vehicle;

traffic conditions;

a time of day;

a location of the vehicle; or a type of fault associated with the vehicle.

10. The method of clause 9, wherein the location is based on one or more of:

a location of the vehicle relative to a junction, intersection or other road feature;

a speed limit of a road on which the vehicle is located;

a lane in which the vehicle is located; or a number of lanes for travelling in the same direction as the vehicle.

11. The method of any of clauses 7 to 10, wherein determining a preferred order in which the one or more operators are to perform the tasks, comprises:

determining a plurality of different orders in which the one or more operators can perform the tasks associated with the plurality of vehicles;

for respective orders of the plurality of different orders, determining an order cost associated with the order, the order cost being based on: (i) the urgency metrics associated with the plurality of vehicles, (ii) the lengths of time associated with performing the tasks, and (iii) the order in which the tasks are to be performed; and selecting, based on the order costs, the preferred order from the plurality of different orders.

12. The method of clause 11, wherein for respective orders of the plurality of different orders, determining an order cost associated with the order comprises:

determining for respective tasks in the order:

a resolution time based on: (i) the length of time associated with performing the task, and (ii) the cumulative length of time associated with performing prior tasks in the order; and a task cost based on: (i) the resolution time, and (ii) the urgency metric associated with the vehicle;

wherein the order cost associated with the order is based on a sum of the task costs for the order.

13. The method of clause 12, wherein the resolution time is further based on at least one task switching time, the task switching time being indicative of a time taken for an operator to switch from one task to another task.

14. The method of clause 11 or 12, wherein after selecting the preferred order, the method further comprises:

determining that an additional task associated with an additional vehicle is required to be performed by the one or more operators; and determining where in the preferred order the additional task is to be performed.

15. The method of clause 14, wherein determining where in the preferred order the additional task is to be performed comprises determining an updated preferred order, the updated preferred order having the additional task at a particular position within the preferred order, and wherein determining the updated preferred order comprises:

determining a plurality of updated preferred orders, the plurality of updated preferred orders having the tasks associated with the plurality of vehicles arranged in the same order as in the preferred order and the additional task associated with the additional vehicle arranged at different positions within the preferred order;

for respective orders of the plurality of updated preferred orders, determining an order cost associated with the order, the order cost being based on: (i) the urgency metrics associated with the plurality of vehicles and an urgency metric associated with the additional vehicle, (ii) the lengths of time associated with performing the tasks and a length of time associated with performing the additional task, and (iii) the order in which the tasks in the updated preferred order are to be performed; and selecting, based on the order costs, the updated preferred order from the plurality of updated preferred orders.

16. The method of clause 15, wherein for respective orders of the plurality of updated preferred orders, determining an order cost associated with the order comprises:

determining for respective tasks in the order:

a resolution time based on: (i) the length of time associated with performing the task, and (ii) the cumulative length of time associated with performing prior tasks in the order; and a task cost based on: (i) the resolution time, and (ii) the urgency metric associated with the vehicle;

wherein the order cost associated with the order is based on a sum of the task costs for the order.

17. The method of any of clauses 7 to 16, further comprising one of:

receiving data from respective vehicles of the plurality of vehicles at a system remote from the plurality of vehicles, wherein the urgency metrics for the respective vehicles are determined by the remote system based on the data; or receiving, at the remote system, from respective vehicles of the plurality of vehicles, the urgency metrics associated with the respective vehicles.

18. The method of any of clauses 7 to 17, wherein:

there are N vehicles and N tasks;

there are M operators to perform the tasks associated with the plurality of vehicles; and N>M; and the method comprises:

assigning the first M tasks in the preferred order to the M operators; and assigning the remaining tasks in the preferred order to the M operators based on a total resolution time for each operator, the total resolution time being based on a cumulative length of time associated with performing tasks currently assigned to the operator.

19. The method of any of clauses 7 to 18, further comprising:

receiving data from respective vehicles of the plurality of vehicles at a system remote from the plurality of vehicles; and based on the data, determining by the remote system, that the respective vehicles of the plurality of vehicles require a task to be performed by an operator.

20. One or more non-transitory computer-readable media storing instructions that, when executed by one or more processors of a system, cause the system to perform operations comprising:

for respective vehicles of a plurality of vehicles:

determining or receiving an urgency metric associated with the vehicle, the urgency metric being indicative of urgency in which to perform a task associated with the vehicle; and determining or receiving a length of time associated with performing the task for the vehicle, the task being performed by an operator of one or more operators, the one or more operators being located remote from the plurality of vehicles and being responsible for monitoring and/or controlling the plurality of vehicles; and determining a preferred order in which the one or more operators are to perform the tasks based on the lengths of time and the urgency metrics associated with the plurality of vehicles.

21. One or more non-transitory computer-readable media storing instructions that, when executed by one or more processors of a system, cause the system to perform the method of any of clauses 7 to 19.

22. A system comprising:

one or more processors; and one or more non-transitory computer readable media having instructions stored thereon which, when executed by the one or more processors, cause the one or more processors to the method of any of clauses 7 to 19.

While the example clauses described above are described with respect to one particular implementation, it should be understood that, in the context of this document, the content of the example clauses can also be implemented via a method, device, system, computer-readable medium, and/or another implementation. Additionally, any of example clauses 1-22 may be implemented alone or in combination with any other one or more of the example clauses.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow charts, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

It will be appreciated that throughout this disclosure, any reference to an aspect being based on another aspect, may mean that the aspect is based at least in part on the other aspect.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:

one or more processors; and one or more non-transitory computer readable media having instructions stored thereon which, when executed by the one or more processors, cause the one or more processors to perform operations comprising:

for respective vehicles of a plurality of vehicles:

determining or receiving an urgency metric associated with the vehicle, the urgency metric being indicative of an urgency in which to perform a task associated with the vehicle, and based on a contact metric associated with the vehicle, the contact metric being based on a probability of the vehicle contacting one or more objects in an environment around the vehicle, the contact metric based at least in part on a predicted future path or action, determined by the vehicle, of one or more of the vehicle or the one or more objects based at least in part on sensor data recorded by one or more sensors of the vehicle; and determining or receiving a length of time associated with performing the task for the vehicle, the task being performed by an operator of one or more operators, the one or more operators being located remote from the plurality of vehicles and being responsible for monitoring and/or controlling the plurality of vehicles, the task associated with providing, by the operator, assistance to the vehicle in how to move through an environment;

determining a preferred order in which the one or more operators are to perform the tasks based on the lengths of time and the urgency metrics associated with the plurality of vehicles; and transmitting a signal to a first vehicle of the plurality of vehicles based at least in part on determining the preferred order, the signal configured to cause the first vehicle to be controlled based at least in part on the signal;

wherein determining the preferred order in which the one or more operators are to perform the tasks comprises:

determining a plurality of different orders in which the one or more operators can perform the tasks associated with the plurality of vehicles;

for respective orders of the plurality of different orders, determining an order cost associated with the order, the order cost being based on: (i) the urgency metrics associated with the plurality of vehicles, (ii) the lengths of time associated with performing the tasks, and (iii) the order in which the tasks are to be performed; and selecting, based on the order costs, the preferred order from the plurality of different orders;

wherein for the respective orders of the plurality of different orders, determining the order cost associated with the order comprises determining for respective tasks in the order:

a resolution time based on: (i) the length of time associated with performing the task, and (ii) a cumulative length of time associated with performing prior tasks in the order; and a task cost based on: (i) the resolution time, and (ii) the urgency metric associated with the vehicle.

2. The system of claim 1, wherein after selecting the preferred order, the operations further comprise:

determining that an additional task associated with an additional vehicle is required to be performed by the one or more operators; and determining where in the preferred order the additional task is to be performed.

3. The system of claim 1, wherein for respective orders of the plurality of different orders, the order cost associated with the order is based on a sum of the task costs for the order.

4. The system of claim 1, wherein the resolution time is further based on at least one task switching time, the task switching time being indicative of a time taken for an operator to switch from one task to another task.

5. The system of claim 1, wherein the urgency metric associated with the vehicle is further based on one or more of:

one or more characteristics of one or more passengers in the vehicle;

traffic conditions;

a time of day;

a location of the vehicle; or a type of fault associated with the vehicle.

6. A method, comprising:

for respective vehicles of a plurality of vehicles:

determining an urgency metric associated with the vehicle, the urgency metric being indicative of urgency in which to perform a task associated with the vehicle; and determining a length of time associated with performing the task for the vehicle, the task being performed by an operator of one or more operators, the one or more operators being located remote from the plurality of vehicles and being responsible for monitoring and/or controlling the plurality of vehicles, the task associated with providing assistance to the vehicle in operating within an environment;

determining a preferred order in which the one or more operators are to perform the tasks based on the lengths of time and the urgency metrics associated with the plurality of vehicles; and transmitting a signal to a first vehicle of the plurality of vehicles based at least in part on determining the preferred order, the signal configured to cause the first vehicle to be controlled based at least in part on the signal;

wherein determining the preferred order in which the one or more operators are to perform the tasks comprises:

determining a plurality of different orders in which the one or more operators can perform the tasks associated with the plurality of vehicles;

for respective orders of the plurality of different orders, determining an order cost associated with the order, the order cost being based on: (i) the urgency metrics associated with the plurality of vehicles, (ii) the lengths of time associated with performing the tasks, and (iii) the order in which the tasks are to be performed; and selecting, based on the order costs, the preferred order from the plurality of different orders;

wherein for the respective orders of the plurality of different orders, determining the order cost associated with the order comprises determining for respective tasks in the order:

a resolution time based on: (i) the length of time associated with performing the task, and (ii) a cumulative length of time associated with performing prior tasks in the order; and a task cost based on: (i) the resolution time, and (ii) the urgency metric associated with the vehicle.

7. The method of claim 6, further comprising:

for respective vehicles of the plurality of vehicles:

determining a contact metric associated with the vehicle, the contact metric being based on the probability of the vehicle contacting one or more objects in an environment around the vehicle;

wherein determining an urgency metric associated with the vehicle comprises determining the urgency metric based on the contact metric associated with the vehicle.

8. The method of claim 6, wherein determining an urgency metric associated with the vehicle comprises determining the urgency metric based on one or more of:

one or more characteristics of one or more passengers in the vehicle;

traffic conditions;

a time of day;

a location of the vehicle; or a type of fault associated with the vehicle.

9. The method of claim 8, wherein the location is based on one or more of:

a location of the vehicle relative to a junction, intersection or other road feature;

a speed limit of a road on which the vehicle is located;

a lane in which the vehicle is located; or a number of lanes for travelling in the same direction as the vehicle.

10. The method of claim 6, wherein for respective orders of the plurality of different orders, the order cost associated with the order is based on a sum of the task costs for the order.

11. The method of claim 6, wherein the resolution time is further based on at least one task switching time, the task switching time being indicative of a time taken for an operator to switch from one task to another task.

12. The method of claim 6, wherein after selecting the preferred order, the method further comprises:

determining that an additional task associated with an additional vehicle is required to be performed by the one or more operators; and determining where in the preferred order the additional task is to be performed.

13. The method of claim 12, wherein determining where in the preferred order the additional task is to be performed comprises determining an updated preferred order, the updated preferred order having the additional task at a particular position within the preferred order, and wherein determining the updated preferred order comprises:

determining a plurality of updated preferred orders, the plurality of updated preferred orders having the tasks associated with the plurality of vehicles arranged in the same order as in the preferred order and the additional task associated with the additional vehicle arranged at different positions within the preferred order;

for respective orders of the plurality of updated preferred orders, determining an order cost associated with the order, the order cost being based on: (i) the urgency metrics associated with the plurality of vehicles and an urgency metric associated with the additional vehicle, (ii) the lengths of time associated with performing the tasks and a length of time associated with performing the additional task, and (iii) the order in which the tasks in the updated preferred order are to be performed; and selecting, based on the order costs, the updated preferred order from the plurality of updated preferred orders.

14. The method of claim 13, wherein for respective orders of the plurality of updated preferred orders, determining an order cost associated with the order comprises:

determining for respective tasks in the order:

a resolution time based on: (i) the length of time associated with performing the task, and (ii) the cumulative length of time associated with performing prior tasks in the order; and a task cost based on: (i) the resolution time, and (ii) the urgency metric associated with the vehicle;

wherein the order cost associated with the order is based on a sum of the task costs for the order.

15. The method of claim 6, further comprising one of:

receiving data from respective vehicles of the plurality of vehicles at a system remote from the plurality of vehicles, wherein the urgency metrics for the respective vehicles are determined by the remote system based on the data; or receiving, at the remote system, from respective vehicles of the plurality of vehicles, the urgency metrics associated with the respective vehicles.

16. The method of claim 6, wherein:

there are N vehicles and N tasks;

there are M operators to perform the tasks associated with the plurality of vehicles; and N>M; and the method comprises:

assigning the first M tasks in the preferred order to the M operators; and assigning the remaining tasks in the preferred order to the M operators based on a total resolution time for each operator, the total resolution time being based on a cumulative length of time associated with performing tasks currently assigned to the operator.

17. The method of claim 6, further comprising:

receiving data from respective vehicles of the plurality of vehicles at a system remote from the plurality of vehicles; and based on the data, determining by the remote system, that the respective vehicles of the plurality of vehicles require a task to be performed by an operator.

18. One or more non-transitory computer-readable media storing instructions that, when executed by one or more processors of a system, cause the system to perform operations comprising:

for respective vehicles of a plurality of vehicles:

determining or receiving an urgency metric associated with the vehicle, the urgency metric being indicative of urgency in which to perform a task associated with the vehicle; and determining or receiving a length of time associated with performing the task for the vehicle, the task being performed by an operator of one or more operators, the one or more operators being located remote from the plurality of vehicles and being responsible for monitoring and/or controlling the plurality of vehicles, the task associated with providing assistance to the vehicle in operating within an environment;

determining a preferred order in which the one or more operators are to perform the tasks based on the lengths of time and the urgency metrics associated with the plurality of vehicles; and transmitting a signal to a first vehicle of the plurality of vehicles based at least in part on determining the preferred order, the signal configured to cause the first vehicle to be controlled based at least in part on the signal;

wherein determining the preferred order in which the one or more operators are to perform the tasks comprises:

determining a plurality of different orders in which the one or more operators can perform the tasks associated with the plurality of vehicles;

for respective orders of the plurality of different orders, determining an order cost associated with the order, the order cost being based on: (i) the urgency metrics associated with the plurality of vehicles, (ii) the lengths of time associated with performing the tasks, and (iii) the order in which the tasks are to be performed; and selecting, based on the order costs, the preferred order from the plurality of different orders;

wherein for the respective orders of the plurality of different orders, determining the order cost associated with the order comprises determining for respective tasks in the order:

a resolution time based on: (i) the length of time associated with performing the task, and (ii) a cumulative length of time associated with performing prior tasks in the order; and a task cost based on: (i) the resolution time, and (ii) the urgency metric associated with the vehicle.

* * * * *